(12) United States Patent
Hansen

(10) Patent No.: US 9,576,296 B2
(45) Date of Patent: *Feb. 21, 2017

(54) AUTOMATED SYSTEM FOR ADAPTING MARKET DATA AND EVALUATING PERFORMANCE IN TRANSACTIONS

(71) Applicant: BuyMetrics, Inc., Atlanta, GA (US)

(72) Inventor: Valerie Hansen, Racine, WI (US)

(73) Assignee: BuyMetrics, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,765

(22) Filed: Sep. 6, 2016

(65) Prior Publication Data

US 2016/0371711 A1    Dec. 22, 2016

Related U.S. Application Data

(63) Continuation of application No. 15/237,518, filed on Aug. 15, 2016, which is a continuation of application
(Continued)

(51) Int. Cl.
*G06Q 30/02* (2012.01)
*G06Q 30/06* (2012.01)

(52) U.S. Cl.
CPC ...... *G06Q 30/0201* (2013.01); *G06Q 30/0603* (2013.01); *G06Q 30/0623* (2013.01)

(58) Field of Classification Search
None
See application file for complete search history.

(56) References Cited

U.S. PATENT DOCUMENTS 1,927,702 A    9/1933 Foss
3,581,072 A    5/1971 Nymeyer
(Continued)

FOREIGN PATENT DOCUMENTS

EP    0 407 026 A2    1/1991
JP    62-139088 A    6/1987
(Continued)

OTHER PUBLICATIONS

Böier et al., "Target Costing Can Boost Your Bottom Line," *Strategic Finance* 81(1):49-52, Jul. 1999.
(Continued)

*Primary Examiner* — Robert R Niquette
(74) *Attorney, Agent, or Firm* — Seed IP Law Group LLP

(57) ABSTRACT

A system includes a remotely-located server comprising a metric server adapter, a metrics application, and a communication application. The metric server adapter includes governing logic that manages an evaluation service and predefined instructions for managing metric data. The metrics application is a production application that operates in coordination with the metric server adapter. The metrics application receives an evaluation scenario causing the metrics application to retrieve historical purchase data including one or more price data sets. The metrics application obtains metric data that includes market reference price data, evaluates attributes of responsive items in the metric data to dynamically discover a difference in the attribute data, and dynamically defines transaction-specific instructions for adapting the metric data for a respective item. One or more adjustment values applied to the metric data transform the market reference price data. The metrics application generates and communicates at least one performance metric to a computing device.

156 Claims, 13 Drawing Sheets

Related U.S. Application Data

No. 14/740,630, filed on Jun. 16, 2015, now Pat. No. 9,418,371, which is a continuation of application No. 14/262,682, filed on Apr. 25, 2014, now Pat. No. 9,092,825, which is a continuation of application No. 13/869,942, filed on Apr. 24, 2013, now Pat. No. 8,762,258, which is a continuation of application No. 13/597,200, filed on Aug. 28, 2012, now Pat. No. 8,442,888, which is a continuation of application No. 13/475,900, filed on May 18, 2012, now Pat. No. 8,321,317, which is a continuation of application No. 13/118,351, filed on May 27, 2011, now Pat. No. 8,224,729, which is a continuation of application No. 12/952,083, filed on Nov. 22, 2010, now Pat. No. 7,966,240, which is a continuation of application No. 11/394,540, filed on Mar. 31, 2006, now Pat. No. 7,840,462, which is a continuation of application No. 09/607,502, filed on Jun. 28, 2000, now Pat. No. 7,043,457.

(56) References Cited

U.S. PATENT DOCUMENTS

| | | |
|---|---|---|
| 3,933,305 A | 1/1976 | Murphy |
| 4,412,287 A | 10/1983 | Braddock, III |
| 4,486,853 A | 12/1984 | Parsons |
| 4,674,044 A | 6/1987 | Kalmus et al. |
| 4,868,866 A | 9/1989 | Williams, Jr. |
| 4,903,201 A | 2/1990 | Wagner |
| 4,972,504 A | 11/1990 | Daniel, Jr. et al. |
| 4,992,940 A | 2/1991 | Dworkin |
| 5,063,506 A | 11/1991 | Brockwell et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,172,314 A | 12/1992 | Poland et al. |
| 5,201,047 A | 4/1993 | Maki et al. |
| 5,249,120 A | 9/1993 | Foley |
| 5,293,479 A | 3/1994 | Quitero et al. |
| 5,297,031 A | 3/1994 | Gutterman et al. |
| 5,375,055 A | 12/1994 | Togher et al. |
| 5,414,621 A | 5/1995 | Hough |
| 5,418,943 A | 5/1995 | Borgida et al. |
| 5,446,874 A | 8/1995 | Waclawsky et al. |
| 5,486,995 A | 1/1996 | Krist et al. |
| 5,500,793 A | 3/1996 | Deming, Jr. et al. |
| 5,555,403 A | 9/1996 | Cambot et al. |
| 5,675,785 A | 10/1997 | Hall et al. |
| 5,715,402 A | 2/1998 | Popolo |
| 5,726,914 A | 3/1998 | Janovski et al. |
| 5,727,165 A | 3/1998 | Ordish et al. |
| 5,732,271 A | 3/1998 | Berry et al. |
| 5,732,400 A | 3/1998 | Mandler et al. |
| 5,758,328 A | 5/1998 | Giovannoli |
| 5,761,389 A | 6/1998 | Maeda et al. |
| 5,764,916 A | 6/1998 | Busey et al. |
| 5,771,370 A | 6/1998 | Klein |
| 5,774,879 A | 6/1998 | Custy et al. |
| 5,794,207 A | 8/1998 | Walker et al. |
| 5,799,300 A | 8/1998 | Agrawal et al. |
| 5,809,483 A | 9/1998 | Broka et al. |
| 5,822,751 A | 10/1998 | Gray et al. |
| 5,835,896 A | 11/1998 | Fisher et al. |
| 5,842,178 A | 11/1998 | Giovannoli |
| 5,845,266 A | 12/1998 | Lupien et al. |
| 5,857,174 A | 1/1999 | Dugan |
| 5,873,069 A | 2/1999 | Reuhl et al. |
| 5,873,071 A | 2/1999 | Ferstenberg et al. |
| 5,909,543 A | 6/1999 | Tanaka et al. |
| 5,924,082 A | 7/1999 | Silverman et al. |
| 5,924,083 A | 7/1999 | Silverman et al. |
| 5,937,393 A | 8/1999 | O'Leary et al. |
| 5,950,176 A | 9/1999 | Keiser et al. |
| 5,960,411 A | 9/1999 | Hartman et al. |
| 5,963,910 A | 10/1999 | Ulwick |
| 5,987,435 A | 11/1999 | Weiss et al. |
| 5,991,696 A | 11/1999 | McAndrew |
| 5,999,940 A | 12/1999 | Ranger |
| 6,012,046 A | 1/2000 | Lupien et al. |
| 6,023,683 A | 2/2000 | Johnson et al. |
| 6,034,652 A | 3/2000 | Freiberger et al. |
| 6,035,287 A | 3/2000 | Stallaert et al. |
| 6,038,537 A | 3/2000 | Matsuoka |
| 6,038,540 A | 3/2000 | Krist et al. |
| 6,055,516 A | 4/2000 | Johnson et al. |
| 6,055,518 A | 4/2000 | Franklin et al. |
| 6,058,379 A | 5/2000 | Odom et al. |
| 6,061,662 A | 5/2000 | Makivic |
| 6,076,070 A * | 6/2000 | Stack .................. G06Q 30/06 235/375 |
| 6,078,924 A | 6/2000 | Ainsbury et al. |
| 6,085,164 A | 7/2000 | Smith et al. |
| 6,085,196 A | 7/2000 | Motoyama et al. |
| 6,094,651 A | 7/2000 | Agrawal et al. |
| 6,125,391 A | 9/2000 | Meltzer et al. |
| 6,134,536 A | 10/2000 | Shepherd |
| 6,134,548 A | 10/2000 | Gottsman et al. |
| 6,141,653 A | 10/2000 | Conklin et al. |
| 6,161,103 A | 12/2000 | Rauer et al. |
| 6,163,774 A | 12/2000 | Lore et al. |
| 6,175,619 B1 | 1/2001 | DeSimone |
| 6,205,447 B1 | 3/2001 | Malloy |
| 6,223,164 B1 | 4/2001 | Seare et al. |
| 6,260,024 B1 | 7/2001 | Shkedy |
| 6,278,982 B1 | 8/2001 | Korhammer et al. |
| 6,282,521 B1 | 8/2001 | Howorka |
| 6,285,997 B1 | 9/2001 | Carey et al. |
| 6,308,199 B1 | 10/2001 | Katsurabayashi |
| 6,311,144 B1 | 10/2001 | Abu El Ata |
| 6,317,728 B1 | 11/2001 | Kane |
| 6,336,105 B1 | 1/2002 | Conklin et al. |
| 6,339,775 B1 | 1/2002 | Zamanian et al. |
| 6,339,776 B2 | 1/2002 | Dayani-Fard et al. |
| 6,341,277 B1 | 1/2002 | Coden et al. |
| 6,347,307 B1 | 2/2002 | Sandhu et al. |
| 6,381,605 B1 | 4/2002 | Kothuri et al. |
| 6,385,604 B1 | 5/2002 | Bakalash et al. |
| 6,389,407 B1 | 5/2002 | Paradis et al. |
| 6,408,282 B1 | 6/2002 | Buist |
| 6,411,936 B1 | 6/2002 | Sanders |
| 6,415,263 B1 | 7/2002 | Doss |
| 6,442,533 B1 | 8/2002 | Hinkle |
| 6,460,020 B1 | 10/2002 | Pool et al. |
| 6,477,536 B1 | 11/2002 | Pasumansky et al. |
| 6,484,158 B1 | 11/2002 | Johnson et al. |
| 6,505,172 B1 | 1/2003 | Johnson et al. |
| 6,505,174 B1 | 1/2003 | Keiser et al. |
| 6,505,175 B1 | 1/2003 | Silverman et al. |
| 6,510,434 B1 | 1/2003 | Anderson et al. |
| 6,535,880 B1 | 3/2003 | Musgrove et al. |
| 6,546,402 B1 | 4/2003 | Beyer et al. |
| 6,553,346 B1 | 4/2003 | Walker et al. |
| 6,556,976 B1 | 4/2003 | Callen |
| 6,564,192 B1 | 5/2003 | Kinney, Jr. et al. |
| 6,609,098 B1 | 8/2003 | DeMarcken |
| 6,618,707 B1 | 9/2003 | Gary |
| 6,629,082 B1 | 9/2003 | Hambrecht et al. |
| 6,654,747 B1 | 11/2003 | Van Huben et al. |
| 6,662,174 B2 | 12/2003 | Shah et al. |
| 6,677,963 B1 | 1/2004 | Mani et al. |
| 6,714,933 B2 | 3/2004 | Musgrove et al. |
| 6,778,863 B1 | 8/2004 | Lienhard et al. |
| 6,778,993 B2 | 8/2004 | Wang |
| 6,792,458 B1 | 9/2004 | Muret et al. |
| 6,807,565 B1 | 10/2004 | Dodrill et al. |
| 6,847,938 B1 | 1/2005 | Moore |
| 6,850,900 B1 | 2/2005 | Hare et al. |
| 6,856,967 B1 | 2/2005 | Woolston et al. |
| 6,907,404 B1 | 6/2005 | Li |
| 6,941,280 B1 | 9/2005 | Gastineau et al. |

(56) References Cited

U.S. PATENT DOCUMENTS

| | | | |
|---|---|---|---|
| 6,963,854 B1* | 11/2005 | Boyd et al. | G06Q 30/0283 705/1.1 |
| 6,976,006 B1 | 12/2005 | Verma et al. | |
| 6,990,238 B1 | 1/2006 | Saffer et al. | |
| 6,993,504 B1 | 1/2006 | Friesen et al. | |
| 7,003,486 B1 | 2/2006 | Condamoor et al. | |
| 7,010,494 B2 | 3/2006 | Etzioni et al. | |
| 7,010,511 B1 | 3/2006 | Kinney, Jr. et al. | |
| 7,024,376 B1 | 4/2006 | Yuen | |
| 7,024,383 B1 | 4/2006 | Mancini et al. | |
| 7,031,901 B2 | 4/2006 | Abu El Ata | |
| 7,039,040 B1 | 5/2006 | Burg | |
| 7,043,457 B1 | 5/2006 | Hansen | |
| 7,051,071 B2 | 5/2006 | Stewart et al. | |
| 7,058,598 B1 | 6/2006 | Chen et al. | |
| 7,072,857 B1 | 7/2006 | Calonge | |
| 7,080,033 B2 | 7/2006 | Wilton et al. | |
| 7,107,226 B1 | 9/2006 | Cassidy et al. | |
| 7,107,230 B1 | 9/2006 | Halbert et al. | |
| 7,113,919 B1 | 9/2006 | Norris et al. | |
| 7,124,106 B1 | 10/2006 | Stallaert et al. | |
| 7,133,835 B1 | 11/2006 | Fusz et al. | |
| 7,133,848 B2 | 11/2006 | Phillips et al. | |
| 7,149,717 B1* | 12/2006 | Kan | G06Q 30/00 705/35 |
| 7,165,042 B1 | 1/2007 | Segal et al. | |
| 7,171,386 B1 | 1/2007 | Raykhman | |
| 7,181,424 B1 | 2/2007 | Ketchum et al. | |
| 7,203,661 B1 | 4/2007 | Graff | |
| 7,206,756 B1 | 4/2007 | Walsky | |
| 7,212,996 B1 | 5/2007 | Carnahan et al. | |
| 7,212,997 B1 | 5/2007 | Pine et al | |
| 7,212,999 B2 | 5/2007 | Friesen et | |
| 7,225,150 B2 | 5/2007 | Wilton et al. | |
| 7,231,612 B1 | 6/2007 | Mani et al. | |
| 7,233,923 B1 | 6/2007 | Wallace et al. | |
| 7,246,092 B1 | 7/2007 | Peterson et al. | |
| 7,249,085 B1 | 7/2007 | Kinney, Jr. et al. | |
| 7,251,629 B1 | 7/2007 | Marynowski et al. | |
| 7,283,979 B2 | 10/2007 | Tulloch et al. | |
| 7,296,001 B1 | 11/2007 | Ephrati et al. | |
| 7,315,838 B2 | 1/2008 | Gershon | |
| 7,346,574 B2 | 3/2008 | Smith et al. | |
| 7,373,317 B1 | 5/2008 | Kopelman et al. | |
| 7,373,319 B2 | 5/2008 | Kopelman et al. | |
| 7,379,898 B2 | 5/2008 | Tenorio | |
| 7,383,206 B2 | 6/2008 | Rupp et al. | |
| 7,386,497 B1 | 6/2008 | Gooch | |
| 7,389,211 B2 | 6/2008 | Abu El Ata et al. | |
| 7,392,214 B1 | 6/2008 | Fraser et al. | |
| 7,424,452 B2 | 9/2008 | Feilbogen et al. | |
| 7,430,531 B1 | 9/2008 | Snyder | |
| 7,447,653 B1 | 11/2008 | Watanabe et al. | |
| 7,467,110 B2 | 12/2008 | Müller et al. | |
| 7,472,087 B2 | 12/2008 | Keith | |
| 7,509,261 B1 | 3/2009 | McManus et al. | |
| 7,509,283 B2 | 3/2009 | Friesen et al. | |
| 7,536,335 B1 | 5/2009 | Weston et al. | |
| 7,552,095 B2 | 6/2009 | Kalyan | |
| 7,562,047 B2 | 7/2009 | Friesen et al. | |
| 7,577,582 B1 | 8/2009 | Ojha et al. | |
| 7,577,606 B1 | 8/2009 | Ford | |
| 7,584,144 B2 | 9/2009 | Friesen et al. | |
| 7,603,286 B2 | 10/2009 | Ouimet | |
| 7,653,583 B1 | 1/2010 | Leeb et al. | |
| 7,660,738 B1 | 2/2010 | Siegel et al. | |
| 7,680,723 B2 | 3/2010 | Friesen et al. | |
| 7,684,144 B1 | 3/2010 | Goker et al. | |
| 7,685,048 B1 | 3/2010 | Hausman et al. | |
| 7,689,495 B1 | 3/2010 | Kim et al. | |
| 7,702,615 B1 | 4/2010 | Delurgio et al. | |
| 7,725,358 B1 | 5/2010 | Brown et al. | |
| 7,725,383 B2 | 5/2010 | Wilton et al. | |
| 7,742,934 B2 | 6/2010 | Offutt, Jr. et al. | |
| 7,752,122 B2 | 7/2010 | Friesen et al. | |
| 7,765,140 B1 | 7/2010 | Megiddo | |
| 7,769,612 B1 | 8/2010 | Walker et al. | |
| 7,835,970 B1 | 11/2010 | Marchegiani | |
| 7,840,476 B1 | 11/2010 | Zack et al. | |
| 7,958,013 B2 | 6/2011 | Porat et al. | |
| 7,970,713 B1 | 6/2011 | Gorelik et al. | |
| 7,979,347 B1 | 7/2011 | Greener et al. | |
| 8,005,684 B1 | 8/2011 | Cheng et al. | |
| 8,150,735 B2 | 4/2012 | Walker et al. | |
| 8,229,831 B2 | 7/2012 | Fraser et al. | |
| 8,326,697 B2 | 12/2012 | Kopelman et al. | |
| 8,407,116 B1 | 3/2013 | Serkin et al. | |
| 8,554,659 B2 | 10/2013 | Annunziata | |
| 8,688,564 B2 | 4/2014 | Friesen et al. | |
| 8,768,824 B2 | 7/2014 | Friesen et al. | |
| 2001/0032116 A1 | 10/2001 | Hyatt | |
| 2001/0032163 A1 | 10/2001 | Fertik et al. | |
| 2001/0032171 A1* | 10/2001 | Brink et al. | G06Q 40/04 705/37 |
| 2002/0007324 A1 | 1/2002 | Centner et al. | |
| 2002/0010663 A1 | 1/2002 | Muller | |
| 2002/0019794 A1 | 2/2002 | Katz et al. | |
| 2002/0026403 A1 | 2/2002 | Tambay et al. | |
| 2002/0026630 A1 | 2/2002 | Schmidt et al. | |
| 2002/0069134 A1 | 6/2002 | Solomon | |
| 2002/0111873 A1 | 8/2002 | Ehrlich et al. | |
| 2002/0152135 A1 | 10/2002 | Beeri et al. | |
| 2002/0156685 A1 | 10/2002 | Ehrlich et al. | |
| 2003/0065586 A1 | 4/2003 | Shaftel et al. | |
| 2003/0093343 A1 | 5/2003 | Huttenlocher et al. | |
| 2003/0097328 A1 | 5/2003 | Lundberg et al. | |
| 2003/0233305 A1 | 12/2003 | Solomon | |
| 2004/0015415 A1* | 1/2004 | Cofino et al. | G06Q 10/063 705/7.11 |
| 2005/0010494 A1 | 1/2005 | Mourad et al. | |
| 2005/0021366 A1* | 1/2005 | Pool et al. | G06F 17/2827 705/26.1 |
| 2006/0015413 A1* | 1/2006 | Giovannoli | G06Q 30/06 705/26.1 |
| 2006/0253334 A1 | 11/2006 | Fukasawa | |
| 2007/0250431 A1 | 10/2007 | Olof-Ors | |
| 2008/0071638 A1 | 3/2008 | Wanker | |
| 2008/0077542 A1 | 3/2008 | McElhiney et al. | |
| 2008/0270221 A1 | 10/2008 | Clemens et al. | |
| 2009/0083120 A1 | 3/2009 | Strichman et al. | |
| 2009/0138411 A1 | 5/2009 | O'Callahan | |
| 2010/0023379 A1 | 1/2010 | Rappaport et al. | |
| 2010/0082419 A1 | 4/2010 | Au-Yeung et al. | |
| 2010/0185554 A1 | 7/2010 | Sivasundaram et al. | |

FOREIGN PATENT DOCUMENTS

| | | |
|---|---|---|
| WO | 96/08783 A1 | 3/1996 |
| WO | 97/31322 A1 | 8/1997 |
| WO | 00/16232 A1 | 3/2000 |
| WO | 01/63521 A2 | 8/2001 |

OTHER PUBLICATIONS

Burke, "The Effects of Missing Information on Decision Strategy Selection," *Advances in Consumer Research* 17:250-256, 1990.

Lovelock et al., "Developing Global Strategies for Service Businesses," *California Management Review* 38(2):64-86, 1996.

Mantel et al., "The Role of Direction of Comparison, Attribute-Based Processing, and Attitude-Based Processing in Consumer Preference," *Journal of Consumer Research* 25:335-352, Mar. 1999.

O'Brien, "A Day at the Park Costs More Than Ever," *Amusement Business* 108(25):3-5, Jun. 1996.

Plotkin, "Business Rules Everywhere, Part 2," *Intelligent Enterprise* 2(10):42-48, Jul. 1999.

Plott et al., "Instability of Equilibria in Experimental Markets: Upward-Sloping Demands, Externalities, and Fad-Like Incentives," *Southern Economic Journal* 65(3):405-426, 1999.

\* cited by examiner

http://www.probuild.com/buymetrics/RFQSoftwood/Compare.asp?Order=T&RFQID=82

FILE  EDIT  VIEW  FAVORITES  TOOLS  HELP

BACK  FORWARD  STOP  REFRESH  HOME  SEARCH  FAVORITES  HISTORY  MAIL  SIZE  PRINT

LINKS >>  ADDRESS  http://www.probuild.com/buymetrics/RFQSoftwood/Compare.asp?Order=T&RFQID=82  GO

Softwoods RFQ Summary

Unsubmit  Close/Archive  Resend  Add Response  Display Notes

Requested Tally(s):

Delivered on or Before: 8/01/00   For Delivery week of (FORWARD PRICE):

| Qty | Delivery | Lumber Type | 8 | 10 | 12 | 14 | 16 | 18 | 20 |
|---|---|---|---|---|---|---|---|---|---|
| 1 | Car50 | 2 x 4 ESPF 2&B | 4 | 4 | 6 | 2 | 6 | | |
| or | | | | | | | | | |

Tally Response Information:

Lumber Supplier

Comparison: PCS/Unit: 294 Price/M: 320 Freight: Quote $/ Metric $: 0.97 /08029 Metric $ / M: 333-2790 View Calculation Detail  Buy Delivered on or Before: 8/1/00   For Delivery week of (FORWARD PRICE):

| Qty | Delivery | Lumber Type | 8 | 10 | 12 | 14 | 16 | 18 | 20 | Delivery Location: | Price | Price Units |
|---|---|---|---|---|---|---|---|---|---|---|---|---|
| 1 | Car50 | 2 x 4 ESPF 2&B | 4 | 4 | 6 | 3 | 5 | | | Chicago, Illinois | 320 | m |
| or | | | | | | | | | | net 10 | | |

Lumber Supplier

Comparison: PCS/Unit: 294 Price/M: 322 Freight: Quote $/ Metric $: 0.97 /04303 Metric $ / M: 333-791 View Calculation Detail  Buy Delivered on or Before: 8/1/00   For Delivery week of (FORWARD PRICE):

| Qty | Delivery | Lumber Type | 8 | 10 | 12 | 14 | 16 | 18 | 20 | Delivery Location: | Price | Price Units |
|---|---|---|---|---|---|---|---|---|---|---|---|---|
| 1 | Car50 | 2 x 4 ESPF 2&B | 4 | 4 | 6 | 2 | 6 | | | Chicago, Illinois | 322 | m |
| or | | | | | | | | | | net 10 | | |

http://www.probuild.com/buymetrics/SoftwoodTally.asp?MetricID=194$Action=FromSummary

FILE EDIT VIEW FAVORITES TOOLS HELP

BACK FORWARD STOP REFRESH HOME SEARCH FAVORITES HISTORY MAIL SIZE PRINT

LINKS » | ADDRESS | http://www.probuild.com/buymetrics/SoftwoodTally.asp?MetricID=194$Action=FromSummary | GO New Softwood RFQ | List Open Softwoods RFQs | List Submitted Softwoods RFQs | List Closed Softwoods RFQs | Tally Calculator Manager
New Panel RFQ | List Open Panels RFQs | List Submitted Panels RFQs | List Closed Panels RFQs
New Program and Buy RFQ | List Unsolicited Offers Lumber Type:
2 x 4 WSPF 2&B
2 x 6 WSPF 2&B
2 x 4 ESPF 2&B Boston
2 x 8 WSPF 2&B
2 x 10 WSPF 2&B Calculate

| PCS Per Unit: | Price/M | Lumber Dimension: | Freight: | Metric $/M: | Quote $/Metric $ | | | | |
|---|---|---|---|---|---|---|---|---|---|
| 294 | 322 | 2 x 4 | | 331.791 | 0.970490 | | | | |

| Length | Qty | PCS | Piece | BF Total | Invoice Cost | Price | Spec Cost | Adj Cost | Metric $/M | Adj Piece Cost | Total: |
|---|---|---|---|---|---|---|---|---|---|---|---|
| 8 | 4 | 1176 | 5.3333 | 6272 | 2019.584 | 220 | 1881.6 | 1826.075 | 291.147 | 1.553 | 1826.328 |
| 10 | 4 | 1176 | 6.6667 | 7840 | 2524.48 | 225 | 2391.2 | 2320.636 | 295.999 | 1.973 | 2320.248 |
| 12 | 6 | 1764 | 8 | 14112 | 4544.064 | 220 | 4233.6 | 4108.668 | 291.147 | 2.329 | 4108.356 |
| 14 | 2 | 588 | 9.3333 | 5488 | 1767.136 | 260 | 1865.92 | 1810.857 | 329.967 | 3.08 | 1811.04 |
| 16 | 6 | 1764 | 10.6667 | 18816 | 6058.752 | 295 | 7056 | 6847.78 | 363.934 | 3.882 | 6847.848 |
| 18 | | 0 | 12 | | | 285 | | | | | |
| 20 | | 0 | 13.3333 | | | 285 | | | | | |
| TOTALS | 22 | 6468 | | 52528 | 16914.016 | | 17428.32 | 16914.016 | | | 16913.82 |

AUTOMATED SYSTEM FOR ADAPTING MARKET DATA AND EVALUATING PERFORMANCE IN TRANSACTIONS

BACKGROUND

Technical Field

This present disclosure generally relates to electronic commerce software applications and, more particularly, to evaluating prices and transactions for purchasing.

Description of the Related Art

Commodity items such as lumber, agricultural products, metals, and livestock/meat are usually traded in the open market between a number of buyers and sellers. The sales transactions of most commodity items involve a number of parameters. For instance, in the trade of commodity lumber, a buyer usually orders materials by specifying parameters such as lumber species, grade, size (i.e., 2×4, 2×10, etc.), and length, as well as the "tally" or mix of units of various lengths within the shipment, method of transportation (i.e., rail or truck), shipping terms (i.e., FOB or delivered), and desired date of receipt, with each parameter influencing the value of the commodity purchase. Given the multiple possible combinations of factors, a commodity buyer often finds it difficult to objectively compare similar but unequal offerings among competing vendors.

For example, in a case where a lumber buyer desires to order a railcar load of spruce (SPF) 2×4's of #2 & Better grade, the buyer would query vendors offering matching species and grade carloads seeking the best match for the buyer's need or tally preference at the lowest market price. Lumber carloads are quoted at a price per thousand board feet for all material on the railcar. When the quoted parameters are not identical, it is very difficult for buyers to determine the comparative value of unequal offerings.

Typically, a lumber buyer will find multiple vendors each having different offerings available. For example, a railcar of SPF 2×4's may be quoted at a rate of $300/MBF (thousand board feet) by multiple vendors. Even though the MBF price is equal, one vendor's carload may represent significantly greater marketplace value because it contains the more desirable lengths of 2×4's, such as market-preferred 16-foot 2×4's. When the offering price varies in addition to the mix of lengths, it becomes increasingly difficult to compare quotes from various vendors. Further, because construction projects often require long lead times, the lumber product may need to be priced now, but not delivered until a time in the future. Alternately, another species of lumber (i.e., southern pine) may represent an acceptable substitute.

Therefore, from the foregoing, there is a need for a method and system that allows buyers to evaluate the price of commodity offerings possessing varying shipping parameters.

BRIEF SUMMARY

Described herein is a system that operates in a networked environment. In at least one aspect, the system comprises a remotely-located server that includes a network interface, a non-transitory computer-readable medium having computer-executable instructions stored thereon, and a processor in communication with the network interface and the computer-readable medium. The processor is configured to execute the computer-executable instructions stored in the computer-readable medium. When executed, the computer-executable instructions implement a plurality of components including a metric server adapter, a metrics application, and at least one communication application.

The metric server adapter includes governing logic that is programmed to manage at least one evaluation service and a plurality of predefined instructions for managing metric data, and to dynamically define transaction-specific instructions for adapting metric data. In at least one embodiment, the plurality of predefined instructions includes instructions customized for a particular user-agent and/or industry. The metrics application is a production application programmed to manage one or more purchase and/or analysis processes and to invoke and execute the at least one evaluation service in coordination with the metric server adapter. The metrics application is further programmed to manage one or more user interfaces that, in operation, facilitate interactions with the remotely-located server. The at least one communication application is programmed to manage one or more protocols that facilitate communications between one or more computing devices and the remotely-located server via the network interface.

In operation, in response to receipt of a triggering request from a user-agent computing device, the at least one communication application identifies an applicable protocol for communicating with the user-agent computing device and the metrics application receives, from the user-agent computing device, at least one evaluation scenario for analysis. The at least one evaluation scenario identifies one or more buyer-agents, one or more product specification data sets, and at least one particular time or period of time. Each product specification data set identifies at least one item that is defined by a plurality of attributes having attribute data that includes two or more parameter values or a plurality of items having a plurality of attributes that differ by at least one parameter value.

Receipt of the at least one evaluation scenario triggers the metrics application to invoke the at least one evaluation service which causes the metrics application, for each buyer-agent identified in the at least one evaluation scenario, to retrieve historical purchase data of the buyer agent. The historical purchase data is retrieved for the at least one particular time or period of time from one or more memories accessible to the remotely-located server. The retrieved historical purchase data includes one or more price data sets that are responsive to at least one item identified in the one or more product specification data sets. Each price data set includes price data for the at least one item, and each item possesses a plurality of attributes that include at least one parameter value.

Invocation of the at least one evaluation service further causes the metrics application to obtain metric data from at least one data source accessible to the remotely-located server for each price data set. The obtained metric data represents market reference data for at least one responsive item having attributes corresponding to attributes of a respective item as identified in the price data set and includes market reference price data for the at least one particular time or period of time. Each responsive item in the metric data possesses a plurality of attributes including at least one parameter value.

The metrics application is further caused to evaluate the plurality of attributes of each responsive item in the metric data relative to the plurality of attributes for the respective item as identified in the price data set to dynamically discover a difference in the attribute data. A discovered difference is disclosed to the metric server adapter which enables the metric server adapter to contextually define transaction-specific instructions for adapting the metric data for the respective item.

The metrics application normalizes the metric data by executing the transaction-specific instructions for adapting metric data for the respective item. Execution of at least one transaction-specific instruction causes one or more adjustment values to be generated and applied to the market reference price data for at least one responsive item that differs by at least one parameter value from the respective item, transforming the market reference price data for the at least one responsive item and automatically producing one or more transaction-specific market reference price data values for the respective item.

The metrics application generates at least one performance metric that pertains to the at least one evaluation service for at least one item identified in the one or more product specification data sets for the at least one particular time or period of time. Each performance metric is based, at least in part, on one or a combination of the transaction-specific market reference price data values produced for the respective item as identified in the price data sets associated with each buyer-agent. The metrics application is further programmed to communicate, in cooperation with the at least one communication application, at least one performance metric generated for each buyer-agent identified in the at least one evaluation scenario, via the network interface, to at least the user-agent computing device.

In another aspect of the present disclosure, in response to receipt of a triggering request from a buyer-agent computing device, the at least one communication application identifies an applicable protocol for communicating with the buyer-agent computing device and the metrics application receives, from the buyer-agent computing device, at least one evaluation scenario for analysis. The at least one evaluation scenario identifies one or more seller-agents, at least one product specification data set, and at least one particular time or period of time. Each product specification data set identifies at least one item that is defined by a plurality of attributes having attribute data that includes two or more parameter values or a plurality of items having a plurality of attributes that differ by at least one parameter value.

Receipt of the at least one evaluation scenario triggers the metrics application to invoke the at least one evaluation service which causes the metrics application, for each seller-agent identified in the at least one evaluation scenario, to retrieve historical purchase data of the buyer agent. The historical purchase data is retrieved for the at least one particular time or period of time from one or more memories accessible to the remotely-located server. The retrieved historical purchase data is associated with the seller-agent and includes one or more price data sets that are responsive to at least one item identified in the at least one product specification data set. Each price data set includes price data for the at least one item, and each item possesses a plurality of attributes that include at least one parameter value.

Invocation of the at least one evaluation service further causes the metrics application to obtain metric data from at least one data source accessible to the remotely-located server for each price data set. The obtained metric data represents market reference data for at least one responsive item having attributes corresponding to attributes of a respective item as identified in the price data set and includes market reference price data for at least one particular time or period of time. Each responsive item in the metric data possesses a plurality of attributes having attribute data that includes at least one parameter value.

The metrics application is further caused to evaluate the plurality of attributes of each responsive item in the metric data relative to the plurality of attributes for the respective item as identified in the price data set to dynamically discover a difference in the attribute data. A discovered difference is disclosed to the metric server adapter which enables the metric server adapter to contextually define transaction-specific instructions for adapting the metric data for the respective item.

The metrics application normalizes the metric data by executing the transaction-specific instructions for adapting metric data for the respective item. Execution of at least one transaction-specific instruction causes one or more adjustment values to be generated and applied to the market reference price data for at least one responsive item that differs by at least one parameter value from the respective item, transforming the market reference price data for the responsive item and automatically producing one or more transaction-specific market reference price data values for the respective item.

The metrics application generates at least one performance metric that pertains to the at least one evaluation service for at least one item identified in the at least one product specification data set for the at least one particular time or period of time. Each performance metric is based, at least in part, on one or a combination of the transaction-specific market reference price data values produced for the respective item as identified in the price data sets associated with each seller-agent. The metrics application is further programmed to communicate, in cooperation with the at least one communications application, at least one performance metric generated for each seller-agent identified in the at least one evaluation scenario, via the network interface, to at least the buyer-agent controlled computing device.

In yet another aspect of the present disclosure, in response to receipt of a triggering request from a buyer-agent computing device, the at least one communication application identifies an applicable protocol for communicating with the buyer-agent computing device and the metrics application receives, from the buyer-agent computing device, at least one evaluation scenario for analysis. The at least one evaluation scenario identifies one or more catalogs or pre-negotiated programs, at least one product specification data set, and at least one particular time or period of time. Each product specification data set identifies at least one item that is defined by a plurality of attributes having attribute data that includes two or more parameter values or a plurality of items having a plurality of attributes that differ by at least one parameter value.

Receipt of the at least one evaluation scenario triggers the metrics application to invoke the at least one evaluation service which causes the metrics application, for each catalog or pre-negotiated program identified in the at least one evaluation scenario, to retrieve historical purchase data of the buyer agent for the at least one particular time or period of time from one or more memories accessible to the remotely-located server. The retrieved historical purchase data is associated with the catalog or pre-negotiated program and includes one or more price data sets that are responsive to at least one item identified in the at least one product specification data set. Each price data set includes price data for the at least one item, and each item possesses a plurality of attributes that include at least one parameter value.

Invocation of the at least one evaluation service further causes the metrics application to obtain metric data from at least one data source accessible to the remotely-located server for each price data set. The obtained metric data represents market reference data for at least one responsive item having attributes corresponding to attributes of a respective item as identified in the price data set and includes market reference price data of for the at least one particular time or period of time. Each responsive item in the metric data possesses a plurality of attributes including at least one parameter value.

The metrics application evaluates the plurality of attributes of each responsive item in the metric data relative to the plurality of attributes for the respective item as identified in the price data set to dynamically discover a difference in the attribute data. A discovered difference is disclosed to the metric server adapter which enables the metric server adapter to contextually define transaction-specific instructions for adapting the metric data for the respective item.

The metrics application normalizes the metric data by executing the transaction-specific instructions for adapting metric data for the respective item. Execution of at least one transaction-specific instruction causes one or more adjustment values to be generated and applied to the market reference price data for at least one responsive item that differs by at least one parameter value from the respective item, transforming the market reference price data for the responsive item and automatically producing one or more transaction-specific market reference price data values for the respective item.

The metrics application generates at least one performance metric that pertains to the at least one evaluation service for at least one item identified in the at least one product specification data set for the at least one particular time or period of time. Each performance metric is based, at least in part, on one or a combination of the transaction specific market reference price data values produced for the respective item as identified in the price data sets associated with each catalog or pre-negotiated program. The metrics application is further programmed to communicate, in cooperation with the at least one communication application, at least one performance metric for each catalog or pre-negotiated program identified in the at least one evaluation scenario, via the network interface, to at least the buyer-agent computing device.

In still another aspect of the present disclosure, at a predefined time or over a predefined interval of time or in response to a triggering event, the metrics application automatically invokes the at least one evaluation service and configures the remotely-located server to receive at least one transaction data set from a user-agent computing device or to retrieve data representing at least one transaction data set from one or more databases accessible to the remotely-located server for analysis. Each received or retrieved transaction data set identifies a product specification data set associated with a buyer-agent and a price data set associated with a seller-agent. Each side of the transaction data set identifies at least one item that is defined by a plurality of attributes having attribute data that includes two or more parameter values or a plurality of items having a plurality of attributes that differ by at least one parameter value.

Receipt or retrieval of at least one transaction data set further causes the metrics application, for at least one side of each received or retrieved transaction data set, to obtain metric data from at least one data source accessible to the remotely-located server. The obtained metric data represents market reference data for at least one responsive item having attributes that correspond to attributes of a respective item as identified in the product specification data set or the price data set of the transaction data set and includes market reference price data of a current time or period of time. Each responsive item in the metric data possesses a plurality of attributes including at least one parameter value.

The metrics application evaluates the plurality of attributes of each responsive item in the metric data relative to the plurality of attributes for the respective item as identified in the product specification data set or the price data set to dynamically discover a difference in the attribute data. A discovered difference is disclosed to the metric server adapter which enables the metric server adapter to contextually define transaction-specific instructions for adapting the metric data for the respective item.

The metrics application normalizes the metric data by executing the transaction-specific instructions for adapting metric data for the respective item. Execution of at least one transaction-specific instruction causes one or more adjustment values to be generated and applied to the market reference price data for at least one responsive item that differs by at least one parameter value from the respective item, transforming the market reference price data for the at least one responsive item and automatically producing one or more transaction-specific market reference price data values for the respective item.

The metrics application generates one or more performance metrics that pertain to the at least one evaluation service for at least one item identified in the product specification data set and/or the price data set. Each performance metric is based, at least in part, on one or a combination of the transaction-specific market reference price data values produced for the respective item as identified in the product specification data set or the price data set. The metrics application is further programmed to communicate, in cooperation with the at least one communication application, at least one performance metric for at least one side of each received or retrieved transaction data set, via the network interface, to at least the user-agent computing device or at least one output identified in at least one predefined instruction that pertains to the at least one evaluation service.

In still yet another aspect of the present disclosure, in response to receipt of a triggering request from a user-agent computing device, the at least one communication application identifies an applicable protocol for communicating with the user-agent computing device and the metrics application manages, in coordination with the metric server adapter, at least one customized user interface that includes two or more preconfigured menus preloaded with a plurality of data elements. The data elements are previously predefined in one or more predefined instructions that are preassociated with the at least one evaluation service. Two or more different data elements are dynamically selected by the user-agent to identify at least one evaluation scenario for analysis. At least one selected data element identifies at least one item that is defined by a plurality of attributes having attribute data that includes two or more parameter values or identifies a plurality of items having a plurality of attributes that differ by at least one parameter value.

Identification of the at least one evaluation scenario for analysis triggers the metrics application to invoke the at least one evaluation service which causes the metrics application, for each item as identified in the at least one evaluation scenario, to retrieve historical purchase data from one or more memories accessible to the remotely-located server. The historical purchase data is filtered to be responsive to the two or more selected data elements of the at least one evaluation scenario. The retrieved purchase data includes one or more price data sets that are responsive to the identified at least one item. Each price data set including price data for at least one item possessing a plurality of attributes that include at least one parameter value.

The metrics application is further caused to obtain metric data from at least one data source accessible to the remotely-located server for each price data set. The obtained metric data represents market reference data for at least one responsive item having attributes corresponding to attributes of a respective item in the price data set. Each responsive item in the metric data possesses a plurality of attributes including at least one parameter value.

The metrics application evaluates the plurality of attributes of each responsive item in the metric data relative to the plurality of attributes for the respective item in the price data set to dynamically discover a difference in the attribute data. A discovered difference is disclosed to the metric server adapter which enables the metric server adapter to contextually define transaction-specific instructions for adapting the metric data for the respective item.

The metrics application normalizes the metric data by executing the transaction-specific instructions for adapting metric data for the respective item Execution of at least one transaction-specific instruction causes one or more adjustment values to be generated and applied to the market reference price data for at least one responsive item that differs by at least one parameter value from the respective item, transforming the market reference price data for the at least one responsive item and automatically producing one or more transaction-specific market reference price data values for the respective item.

The metrics application generates at least one performance metric that pertains to the at least one evaluation service for the at least one evaluation scenario. Each performance metric is based, at least in part, on one or a combination of the transaction-specific market reference price data values produced for the respective item in the price data set. The metrics application is further programmed to communicate, in cooperation with the at least one communication application, at least one performance metric generated for the at least one evaluation scenario, via the network interface, to at least the user-agent computing device.

BRIEF DESCRIPTION OF THE SEVERAL VIEWS OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 8A-8D are images of windows produced by a Web browser application installed on a client computer accessing a server illustrating one embodiment of the present disclosure.

DETAILED DESCRIPTION

Figure 1:
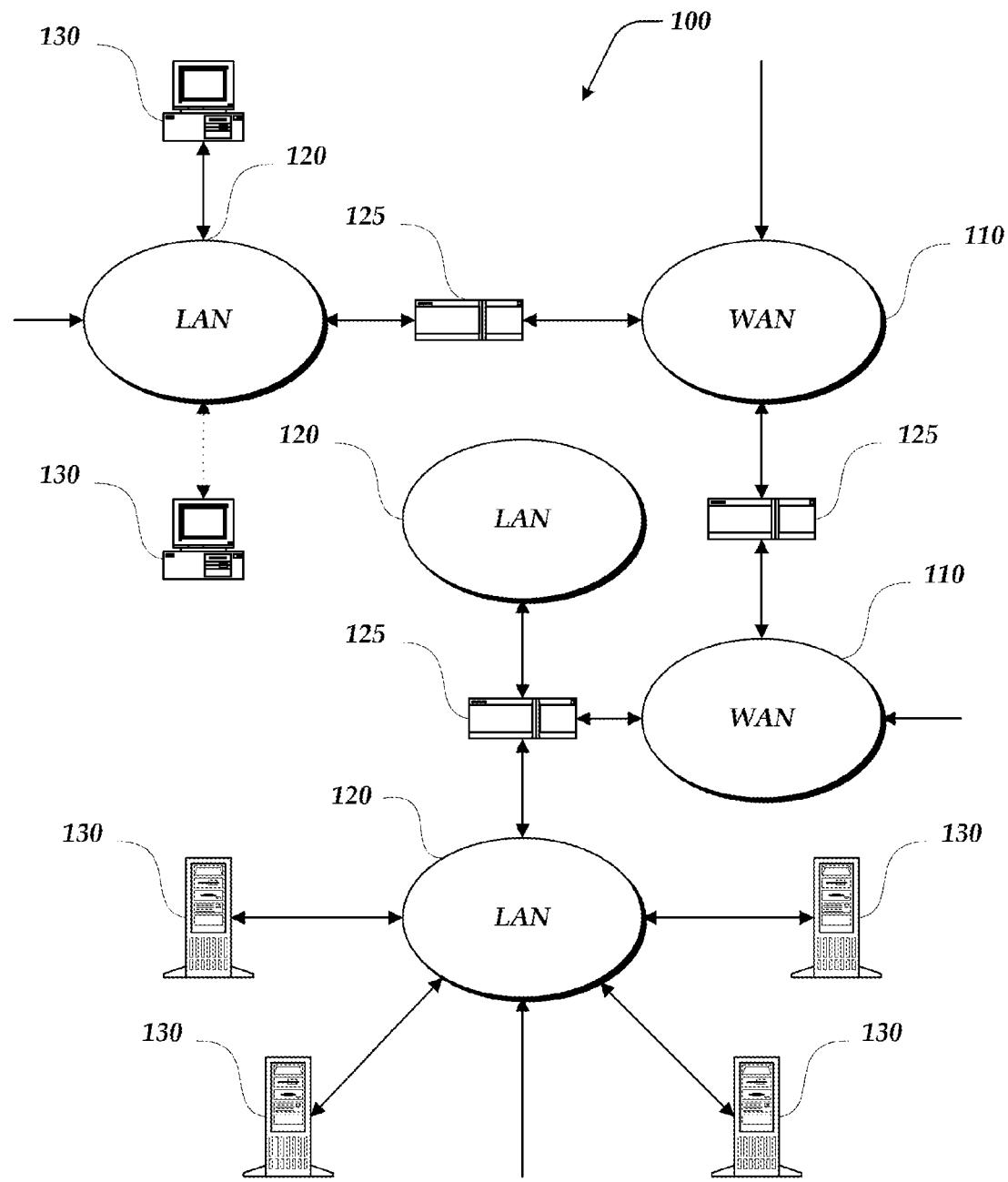
FIG. 1 is a block diagram of a prior art representative portion of the Internet.

The term "Internet" refers to the collection of networks and routers that use the Internet Protocol (IP) to communicate with one another. A representative section of the Internet 100 as known in the prior art is shown in FIG. 1 in which a plurality of local area networks (LANs) 120 and a wide area network (WAN) 110 are interconnected by routers 125. The routers 125 are generally special-purpose computers used to interface one LAN or WAN to another. Communication links within the LANs may be twisted wire pair, or coaxial cable, while communication links between networks may utilize 56 Kbps analog telephone lines, or 1 Mbps digital T-1 lines, and/or 45 Mbps T-3 lines. Further, computers and other related electronic devices can be remotely connected to either the LANs 120 or the WAN 110 via a modem and temporary telephone link. Such computers and electronic devices 130 are shown in FIG. 1 as connected to one of the LANs 120 via dotted lines. It will be appreciated that the Internet comprises a vast number of such interconnected networks, computers, and routers and that only a small representative section of the Internet 100 is shown in FIG. 1.

Figure 2:
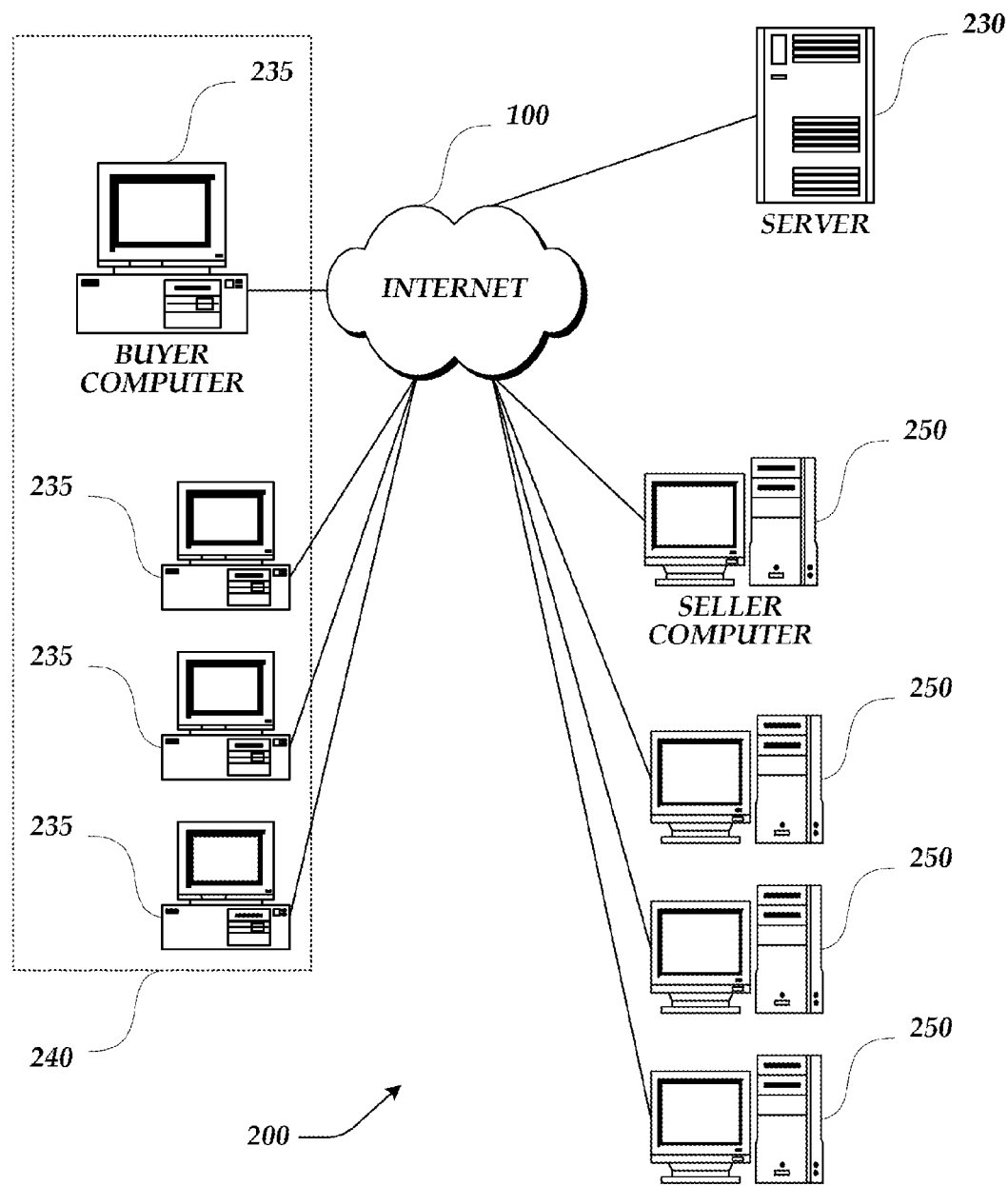
FIG. 2 is a pictorial diagram of a system of devices connected to the Internet, which depict the travel route of data.

The World Wide Web (WWW), on the other hand, is a vast collection of interconnected, electronically stored information located on servers connected throughout the Internet 100. Many companies are now providing services and access to their content over the Internet 100 using the WWW. In accordance with the present disclosure, and as shown in FIG. 2, there may be a plurality of buyers operating a plurality of client computing devices 235. FIG. 2 generally shows a system 200 of computers and devices to which an information server 230 is connected and to which the buyers' computers 235 are also connected. Also connected to the Internet 100 is a plurality of computing devices 250 associated with a plurality of sellers. The system 200 also includes a communications program, referred to as CEA, which is used on the sellers' computing devices 250 to create a communication means between the sellers' backend office software and the server applications.

The buyers of a market commodity may, through their computers 235, request information about a plurality of items or order over the Internet 100 via a Web browser installed on the buyers' computers. Responsive to such requests, the information server 230, also referred to as a server 230, may combine the first buyer's information with information from other buyers on other computing devices 235. The server 230 then transmits the combined buyer data to the respective computing devices 250 associated with the plurality of sellers. Details of this process are described in more detail below in association with FIGS. 5-7.

Those of ordinary skill in the art will appreciate that in other embodiments of the present disclosure, the capabilities of the server 230 and/or the client computing devices 235 and 250 may all be embodied in the other configurations. Consequently, it would be appreciated that in these embodiments, the server 230 could be located on any computing device associated with the buyers' or sellers' computing devices. Additionally, those of ordinary skill in the art will recognize that while only four buyer computing devices 235, four seller computing devices 250, and one server 230 are depicted in FIG. 2, numerous configurations involving a vast number of buyer and seller computing devices and a plurality of servers 230, equipped with the hardware and software components described below, may be connected to the Internet 100.

Figure 3:
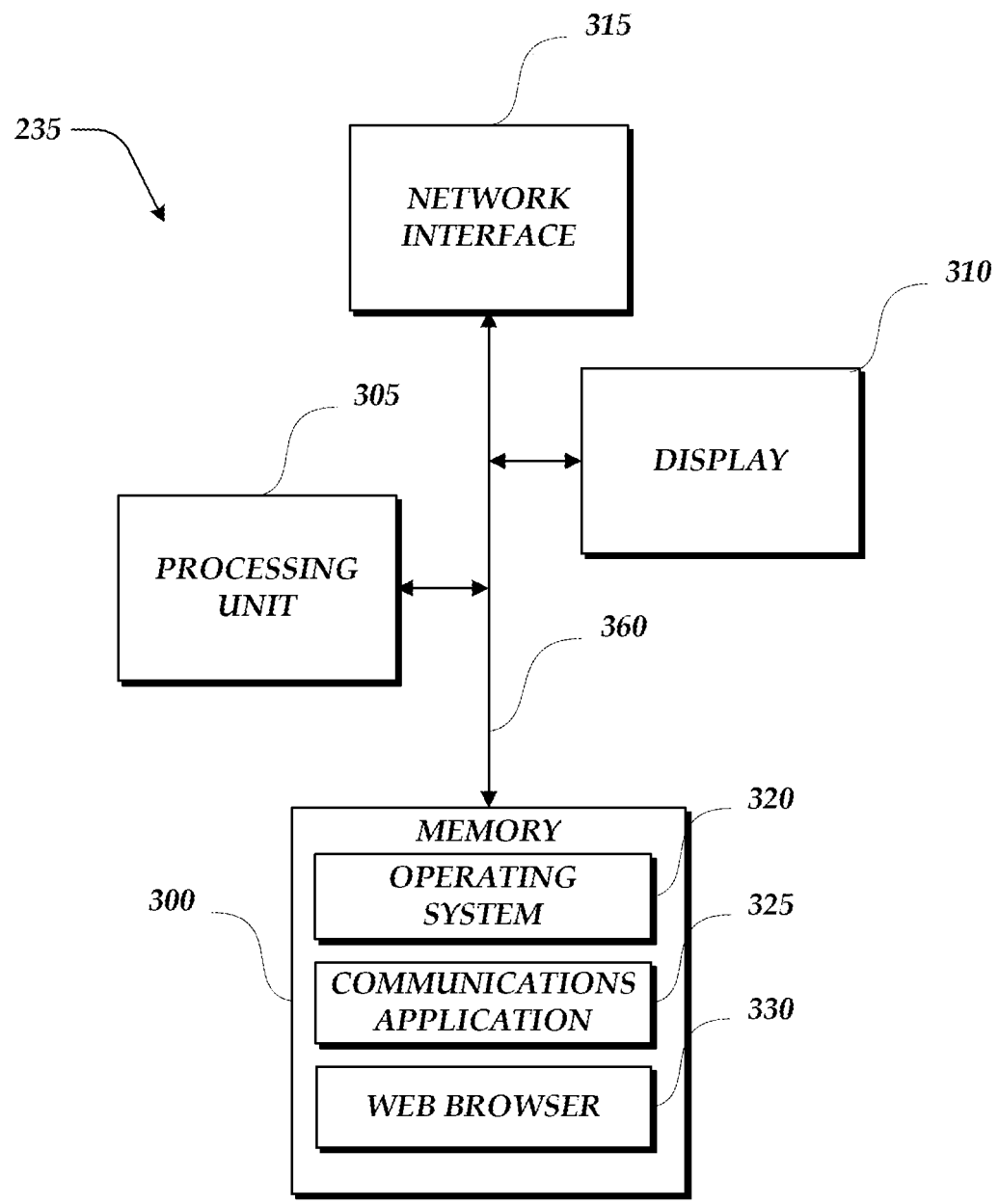
FIG. 3 is a block diagram of the several components of the buyer's computer shown in FIG. 2 that is used to request information on a particular route.

FIG. 3 depicts several of the key components of the buyer's client computing device 235. As known in the art, client computing devices 235 are also referred to as "clients" or "devices," and client computing devices 235 also include other devices such as palm computing devices, cellular telephones, or other like forms of electronics. A client computing device can also be the same computing device as the server 230. An "agent" can be a person, server, or a client computing device 235 having software configured to assist the buyer in making purchasing decisions based on one or more buyer-determined parameters. Those of ordinary skill in the art will appreciate that the buyer's computer 235 in actual practice will include many more components than those shown in FIG. 3. However, it is not necessary that all of these generally conventional components be shown in order to disclose an illustrative embodiment for practicing the present invention. As shown in FIG. 3, the buyer's computer includes a network interface 315 for connecting to the Internet 100. Those of ordinary skill in the art will appreciate that the network interface 315 includes the necessary circuitry for such a connection and is also constructed for use with TCP/IP protocol.

The buyer's computer 235 also includes a processing unit 305, a display 310, and a memory 300, all interconnected along with the network interface 315 via a bus 360. The memory 300 generally comprises a random access memory (RAM), a read-only memory (ROM), and a permanent mass storage device, such as a disk drive. The memory 300 stores the program code necessary for requesting and/or depicting a desired route over the Internet 100 in accordance with the present disclosure. More specifically, the memory 300 stores a Web browser 330, such as Netscape's NAVIGATOR® or Microsoft's INTERNET EXPLORER® browsers, used in accordance with the present disclosure for depicting a desired route over the Internet 100. In addition, memory 300 also stores an operating system 320 and a communications application 325. It will be appreciated that these software components may be stored on a computer-readable medium and loaded into memory 300 of the buyers' computer 235 using a drive mechanism associated with the computer-readable medium, such as a floppy, tape, or CD-ROM drive.

Figure 4:
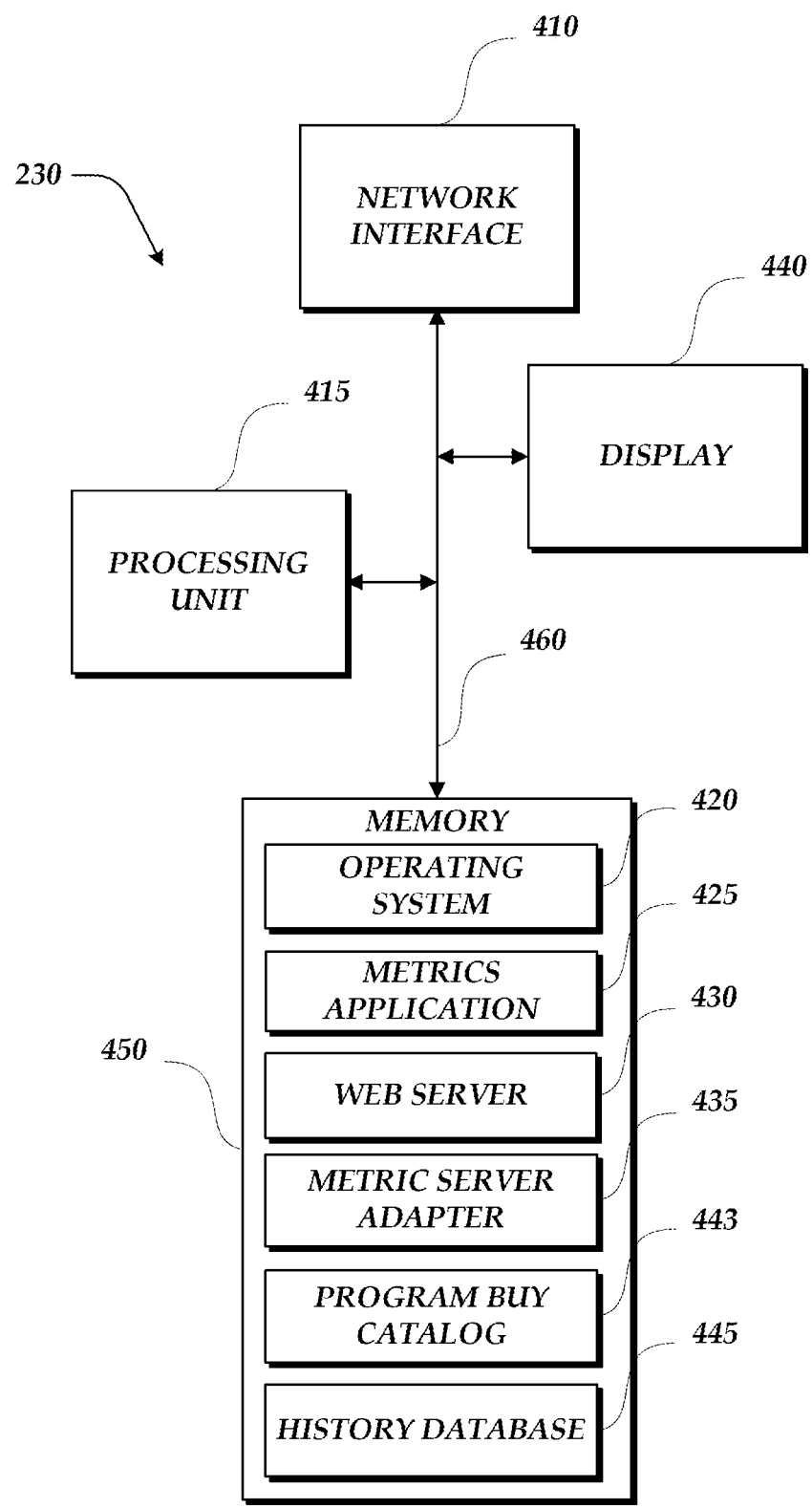
FIG. 4 is a block diagram of the several components of an information server shown in FIG. 2 that is used to supply information on a particular route.

As will be described in more detail below, the user interface which allows products to be ordered by the buyers are supplied by a remote server, i.e., the information server 230 located elsewhere on the Internet, as illustrated in FIG. 2. FIG. 4 depicts several of the key components of the information server 230. Those of ordinary skill in the art will appreciate that the information server 230 includes many more components than shown in FIG. 4. However, it is not necessary that all of these generally conventional components be shown in order to disclose an illustrative embodiment for practicing the present invention. As shown in FIG. 4, the information server 230 is connected to the Internet 100 via a network interface 410. Those of ordinary skill in the art will appreciate that the network interface 410 includes the necessary circuitry for connecting the information server 230 to the Internet 100, and is constructed for use with TCP/IP protocol.

The information server 230 also includes a processing unit 415, a display 440, and a mass memory 450, all interconnected along with the network interface 410 via a bus 460. The mass memory 450 generally comprises a random access memory (RAM), read-only memory (ROM), and a permanent mass storage device, such as a hard disk drive, tape drive, optical drive, floppy disk drive, or combination thereof. The mass memory 450 stores the program code and data necessary for incident and route analysis as well as supplying the results of that analysis to consumers in accordance with the present disclosure. More specifically, the mass memory 450 stores a metrics application 425 formed in accordance with the present disclosure for managing the purchase forums of commodities products, and a metric server adapter 435 for managing metric data. In addition, mass memory 450 stores a database 445 of buyer information continuously logged by the information server 230 for statistical market analysis. It will be appreciated by those of ordinary skill in the art that the database 445 of product and buyer information may also be stored on other servers or storage devices connected to either the information server 230 or the Internet 100. Finally, mass memory 450 stores Web server software 430 for handling requests for stored information received via the Internet 100 and the WWW, and an operating system 420. It will be appreciated that the aforementioned software components may be stored on a computer-readable medium and loaded into mass memory 450 of the information server 230 using a drive mechanism associated with the computer-readable medium, such as floppy, tape, or CD-ROM drive. In addition, the data stored in the mass memory 450 and other memory can be "exposed" to other computers or persons for purposes of communicating data. Thus, "exposing" data from a computing device could mean transmitting data to another device or person, transferring XML data packets, transferring data within the same computer, or other like forms of data communications.

Figure 5:
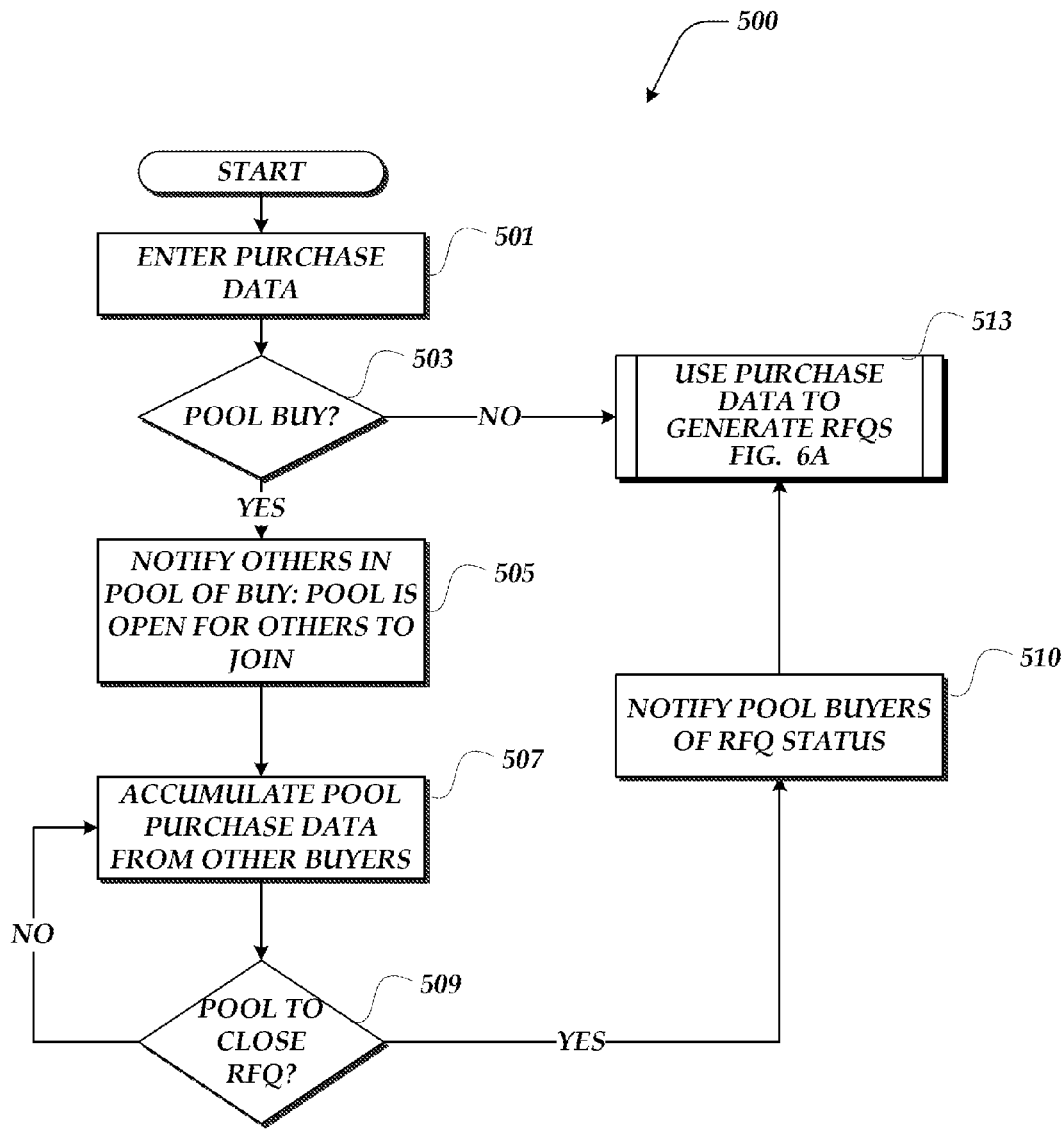
FIG. 5 is a flow diagram illustrating the logic of a routine used by the information server to receive and process the buyer's actions.

In accordance with one embodiment of the present disclosure, FIG. 5 is a flow chart illustrating the logic implemented for the creation of a Request for Quote (RFQ) by a singular buyer or a pool of buyers. In process of FIG. 5, also referred to as the pooling process 500, a buyer or a pool of buyers generate an RFQ which is displayed or transmitted to a plurality of sellers. Responsive to receiving the RFQ, the sellers then send quotes to the buyers.

In summary, the creation of the RFQ consists of at least one buyer initially entering general user identification information to initiate the process. The buyer would then define a Line Item on a Web page displaying an RFQ form. The Line Item is defined per industry specification and units of product are grouped as a "tally" per industry practice. The pooling process 500 allows buyers to combine RFQ Line Items with other buyers with like needs. In one embodiment, the pool buy feature is created by a graphical user interface where the RFQ Line Items from a plurality of buyers are displayed on a Web page to one of the pool buyers, referred to as the pool administrator. The server 230 also provides a Web-based feature allowing the pool administrator to selectively add each RFQ Line Item to one combined RFQ. The combined RFQ is then sent to at least one vendor or seller. This feature provides a forum for pooling the orders of many buyers, which allows individual entities or divisions of larger companies to advantageously bid for larger orders, thus providing them with more bidding power and the possibility of gaining a lower price.

Figure 8A:
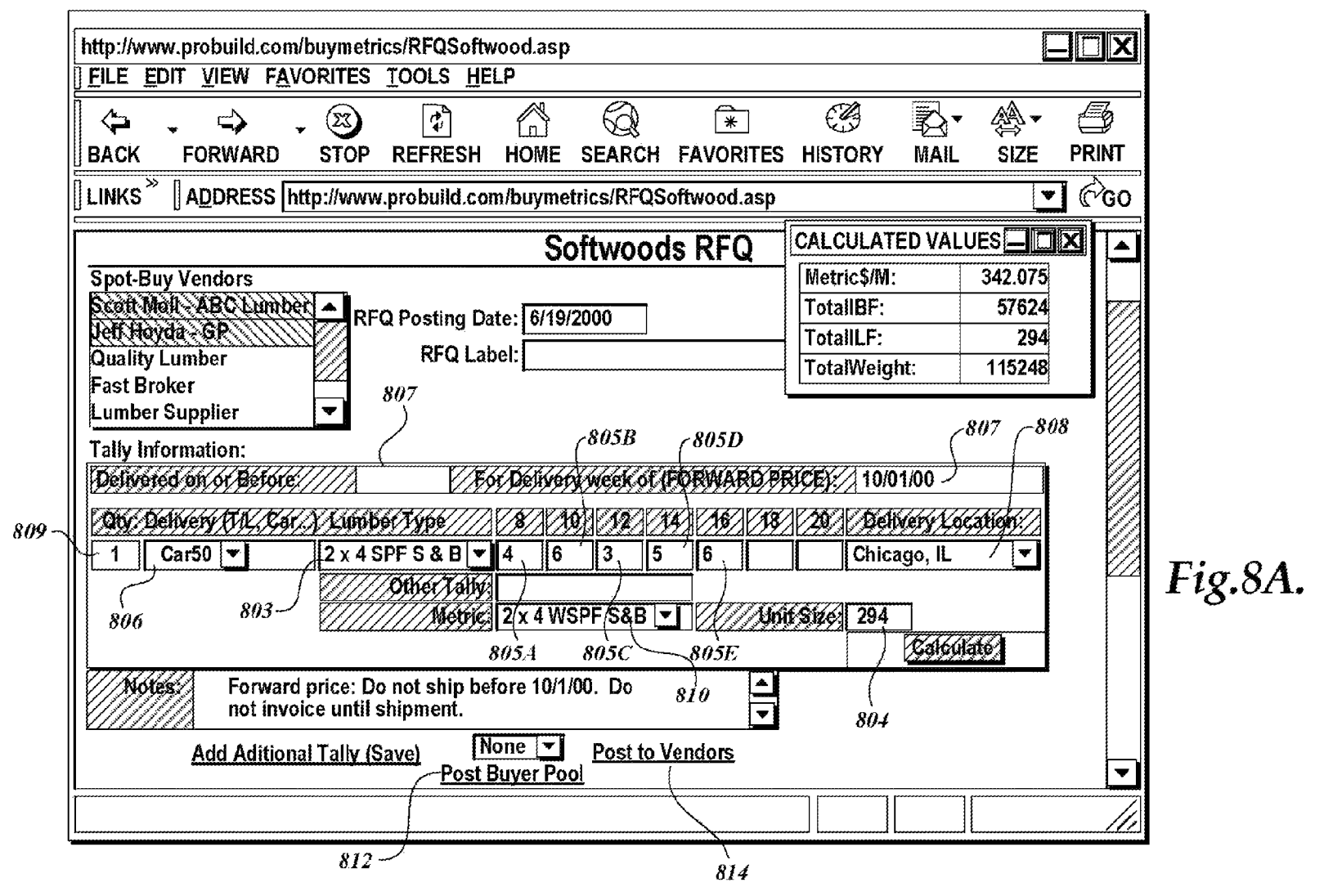

The pooling process 500 begins in step 501 where a buyer initiates the process by providing buyer purchase data. In step 501, the buyer accesses a Web page transmitted from the server 230 configured to receive the buyer purchase data, also referred to as the product specification data set or the Line Item data. One exemplary Web page for the logic of step 501 is depicted in FIG. 8A. As shown in FIG. 8A, the buyer enters the Line Item data specifications in the fields of the Web page. The Line Item data consists of lumber species and grade 803, number of pieces per unit 804, quantities of the various units comprising the preferred assortment in the tally 805A-E, delivery method 806, delivery date 807, delivery location 808, and the overall quantity 809. In one embodiment, the buyer must define the delivery date as either contemporaneous "on-or-before" delivery date or specify a delivery date in the future for a "Forward Price" RFQ. In addition, the buyer selects a metric or multiple metrics in a field 810 per RFQ Line Item (tally). As described in more detail below, the metric provides pricing data that is used as a reference point for the buyer to compare the various quotes returned from the sellers. The buyer RFQ Line Item data is then stored in the memory of the server 230.

Returning to FIG. 5, at a next step 503, the server 230 determines if the buyer is going to participate in a pool buy. In the process of decision block 503, the server 230 provides an option in a Web page that allows the buyer to post their Line Item data to a vendor or post their Line Item data to a buyer pool. The window illustrated in FIG. 8A is one exemplary Web page illustrating these options for a buyer. As shown in FIG. 8A, the links "Post Buyer Pool" 812 and "Post to Vendors" 814 are provided on the RFQ Web page.

At step 503, if the buyer does not elect to participate in a pool buy, the process continues to step 513 where the server 230 generates a request for a quote (RFQ) from the buyer's Line Item data. A detailed description of how the server 230 generates a request for a quote (RFQ) is summarized below and referred to as the purchase order process 600A depicted in FIG. 6A.

Alternatively, at decision block 503, if the buyer elects to participate in a pool buy, the process continues to step 505 where the system notifies other buyers logged into the server 230 that an RFQ is available in a pool, allowing other buyers to add additional Line Items (tallies) to the RFQ. In this part of the process, the Line Items from each buyer are received by and stored in the server memory. The Line Items provided by each buyer in the pool are received by the server 230 using the same process as described above with reference to block 501 and the Web page of FIG. 8A. All of the Line Items stored on the server 230 are then displayed to a pool administrator via a Web page or an e-mail message. In one embodiment, the pool administrator is one of the buyers in a pool where the pool administrator has the capability to select all of the Line Item data to generate a combined RFQ. The server 230 provides the pool administrator with this capability by the use of any Web-based communicative device, such as e-mail or HTML forms. As part of the process, as shown in steps 507 and 509, the pool may be left open for a predetermined period of time to allow additional buyers to add purchase data to the current RFQ.

At decision block 509, the server 230 determines if the pool administrator has closed the pool. The logic of this step 509 is executed when the server 230 receives the combined RFQ data from the pool administrator. The pool administrator can send the combined RFQ data to the server 230 via an HTML form or by other electronic messaging means such as e-mail or URL strings. Once the server 230 has determined that the pool is closed, the process continues to block 510 where the Line Items from each buyer (the combined RFQ) are sent to all of the buyers in the pool. The process then continues to step 513 where the server 230 sends the combined RFQ to the vendors or sellers.

Figure 6A:
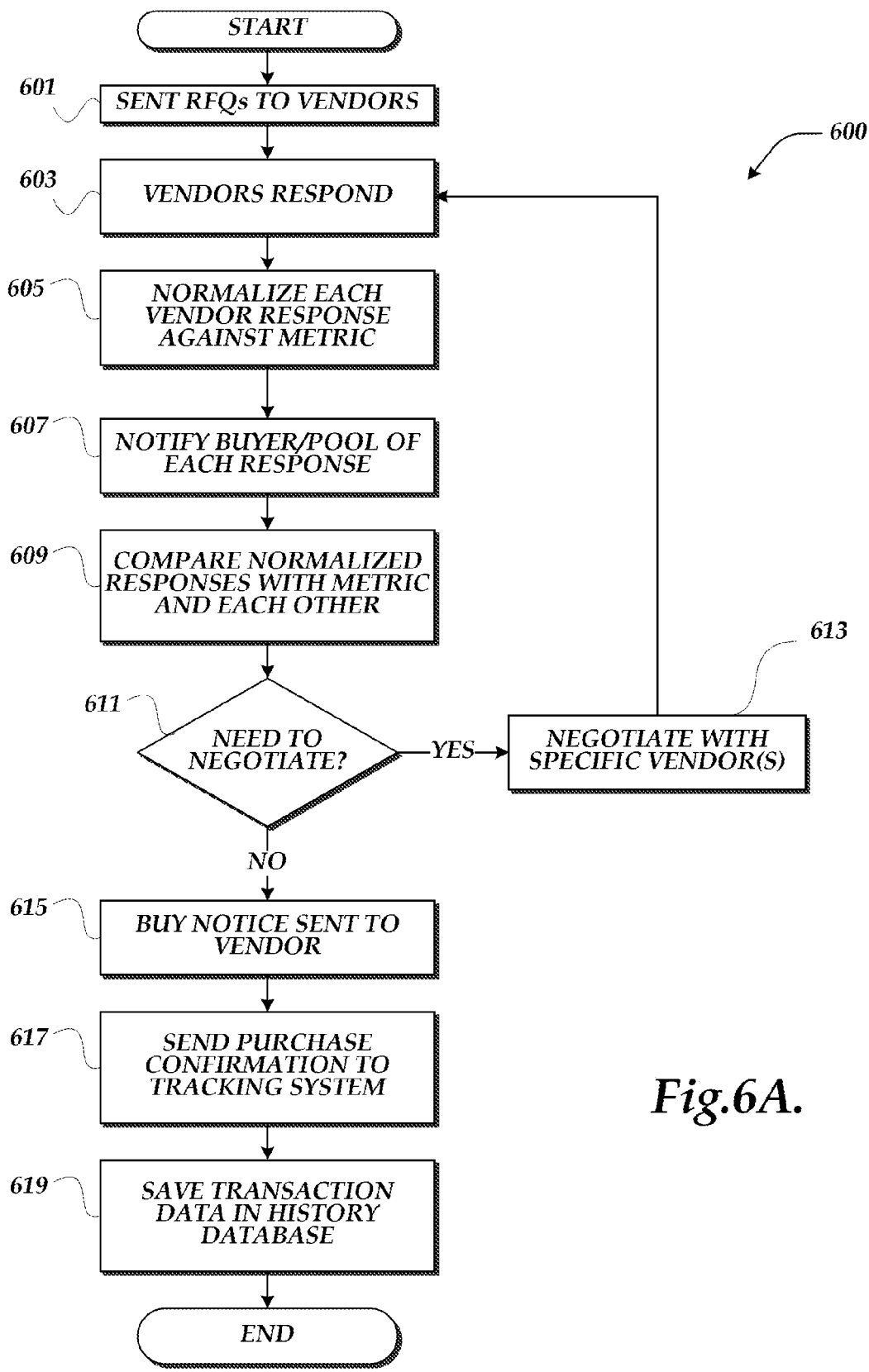
FIGS. 6A-6B are flow diagrams illustrating another embodiment of the logic used by the information server to receive and process the quotes and quote requests of both buyers and vendors.

Referring now to FIG. 6A, one embodiment of the purchase-negotiation process 600 is disclosed. The purchase-negotiation process 600 is also referred to as a solicited offer process or the market purchase process. In summary, the purchase-negotiation process 600 allows at least one buyer to submit an RFQ and then view quotes from a plurality of vendors and purchase items from selected vendor(s). The logic of FIG. 6A provides buyers with a forum that automatically manages, collects, and normalizes the price of desired commodity items. The purchase-negotiation process 600 calculates a normalized price data set that is based on a predefined metric(s). The calculation of the normalized price data set in combination with the format of the Web pages described herein create an integrated forum where quotes for a plurality of inherently dissimilar products can be easily obtained and compared.

The purchase-negotiation process 600 begins at step 601 where the RFQ, as generated by one buyer or a pool of buyers in the process depicted in FIG. 5, is sent to a plurality of computing devices 250 associated with a plurality of sellers or vendors. The vendors receive the RFQ via a Web page transmitted by the server 230. In one embodiment, the vendors receive an e-mail message having a hypertext link to the RFQ Web page to provide notice to the vendor. Responsive to the information in the buyers' RFQ, the process then continues to step 603 where at least one vendor sends their quote information to the server 230.

In the process of step 603, the vendors respond to the RFQ by sending their price quote to the server 230 for display via a Web page to the buyer or buyer pool. Generally described, the vendors send an HTML form or an e-mail message with a price and description of the order. The description of the order in the quote message contains the same order information as the RFQ.

Figure 8B:
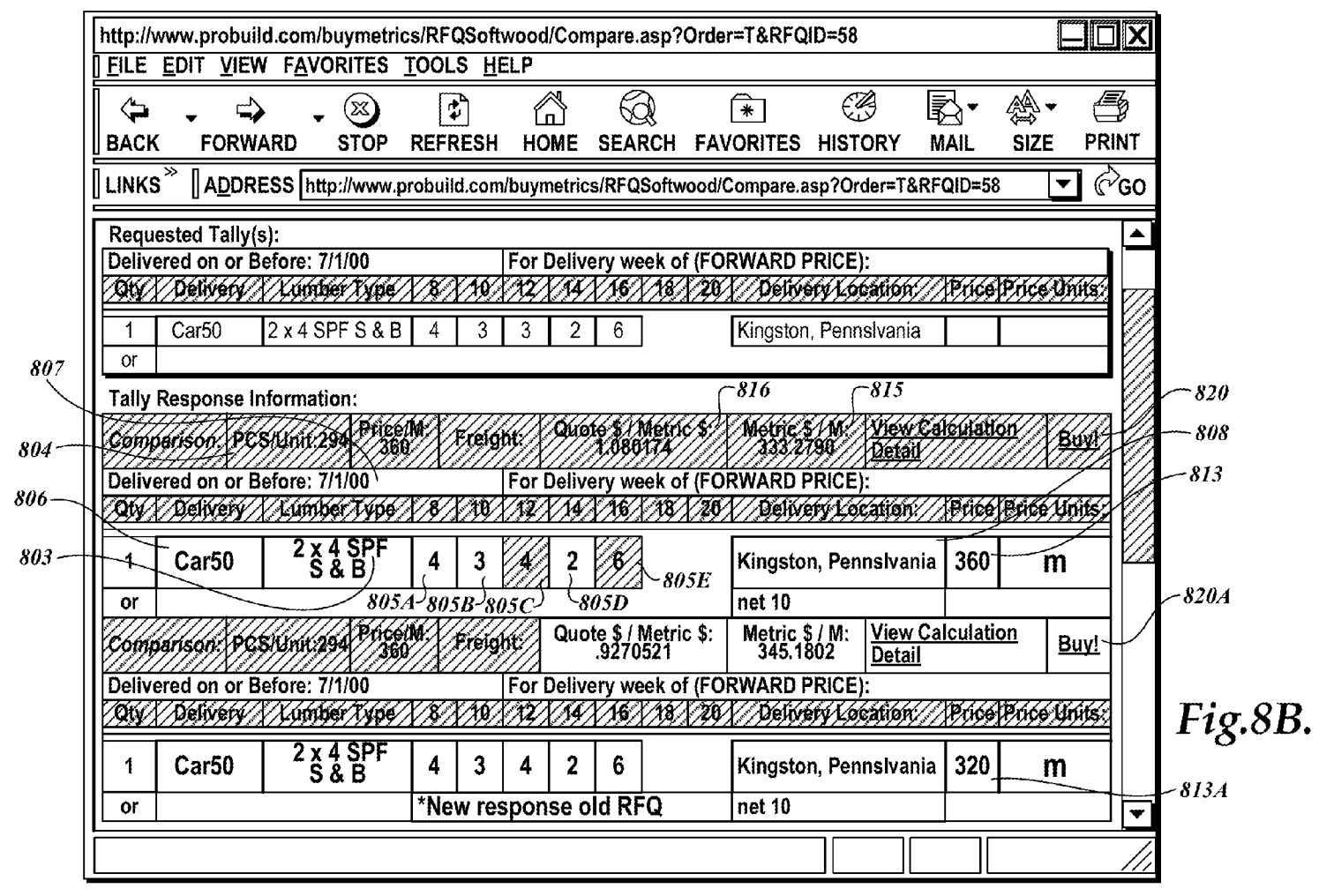

FIG. 8B illustrates one exemplary Web page of a vendor quote that is displayed to the buyer. As shown in FIG. 8B, the vendor quote includes the vendor's price 813, the lumber species and grade 803, number of pieces per unit 804, quantities of the various units comprising the preferred assortment in the tally 805A-E, delivery method 806, delivery date 807, and delivery location 808. In the quote response message, the vendor has the capability to modify any of the information that was submitted in the RFQ. For example, the vendor may edit the quantity values for the various units comprising the preferred assortment in the tally 805A-E. This allows the vendor to adjust the buyer's request according to the vendor's inventory, best means of transportation, etc. All of the vendor's quote information is referred to as price data set or the RFQ Line Item (tally) quote.

Returning to FIG. 6A, the process continues to step 605, where the server 230 normalizes the price of each RFQ Line Item (tally) quote from each vendor. The normalization of the vendor's price is a computation that evaluates the vendor's price utilizing data from a metric. The normalization process is carried out because each vendor may respond to the Line Items of an RFQ by quoting products that are different from a buyer's RFQ and/or have a different tally configuration. The normalization of the pricing allows the buyers to objectively compare the relative value of the different products offered by the plurality of vendors. For example, one vendor may produce a quote for an RFQ of one unit of 2×4×10, two units of 2×4×12, and three units of 2×4×16. At the same time, another vendor may submit a quote for three units of 2×4×10, one unit of 2×4×12, and two units of 2×4×16. Even though there is some difference between these two offerings, the price normalization process provides a means for the buyer to effectively compare and evaluate the different quotes even though there are variations in the products. The price normalization process 900 is described in more detail below in conjunction with the flow diagram of FIG. 9.

Returning again to FIG. 6A, at step 607 the vendor's quote information is communicated to the buyer's computer for display. As shown in FIG. 8B and described in detail above, the vendor's quote is displayed via a Web page that communicates the vendor's quote price 813 and other purchase information. In addition, the vendor's quote page contains a metric price 815 and a quote price versus metric price ratio 816. The metric price 815 and the quote price versus metric price ratio 816 are also referred to as a normalized price data value. A ratio higher than one (1) indicates a quote price that is above the metric price, and a lower ratio indicates a quote price that is below the metric price.

Next, at step 609, the buyer or the administrator of the buyer pool compares the various products and prices quoted by the vendors along with the normalized price for each Line Item on the RFQ. In this part of the process, the buyer may decide to purchase one of the products from a particular vendor and sends a notification to the selected vendor indicating the same. The buyer notifies the selected vendor by the use of an electronic means via the server 230, such as an HTML form, a chat window, e-mail, etc. For example, the quote Web page depicted in FIG. 8B shows two different quotes with two different tallies, the first quote price 813 of $360, and the second quote price 813A of $320. If the buyer determines that they prefer to purchase the materials listed in the first quote, the buyer selects the "Buy!" hyperlink 820 or 820A associated with the desired tally.

If the buyer is not satisfied with any of the listed vendor quotes, the server 230 allows the buyer to further negotiate with one or more of the vendors to obtain a new quote. This step is shown in decision block 611, where the buyer makes the determination to either accept a quoted price or proceed to step 613 where they negotiate with the vendor to obtain another quote or present a counter-offer. Here, the server 230 provides a graphical user interface configured to allow the buyer and one vendor to electronically communicate, using, e.g., a chat window, streaming voice communications, or other standard methods of communication. There are many forms of electronic communications known in the art that can be used to allow the buyer and vendors to communicate.

The buyer and seller negotiate various quotes and iterate through several steps 603-613 directed by the server 230, where each quote is normalized, compared, and further negotiated until a quote is accepted by the buyer or negotiations cease. While the buyer and seller negotiate the various quotes, the server 230 stores each quote until the two parties agree on a price. At any step during the negotiation process, the system always presents the buyer with an option to terminate the negotiation if dissatisfied with the quote(s).

At decision block 611, when a buyer agrees on a quoted price, the process then continues to step 615 where the buyer sends a notification message to the vendor indicating they have accepted a quote. As described above with reference to steps 603-613, the buyer notification message of step 615 may be in the form of a message on a chat window, e-mail, by an HTML form, or the like. However, the buyer notification must be transmitted in a format that allows the system to record the transaction. The buyer notification may include all of the information regarding the specifications by RFQ Line Item, such as, but not limited to, the buy price, date, and method of shipment, and payment terms.

The purchase-negotiation process 600 is then finalized when the system, as shown in step 617, sends a confirmation message to a tracking system. The confirmation message includes all of the information related to the agreed sales transaction.

Optionally, the process includes step 619, where the server 230 stores all of the information related to RFQ, offers, and the final sales transaction in a historical database. This would allow the server 230 to use all of the transaction information in an analysis process for providing an improved method of obtaining a lower market price in future transactions and in identifying optimum purchasing strategy. The analysis process is described in further detail below. Although the illustrated embodiment is configured to store the data related to the sales transactions, the system can also be configured to store all of the iterative quote information exchanged between the buyer and vendor.

Figure 6B:
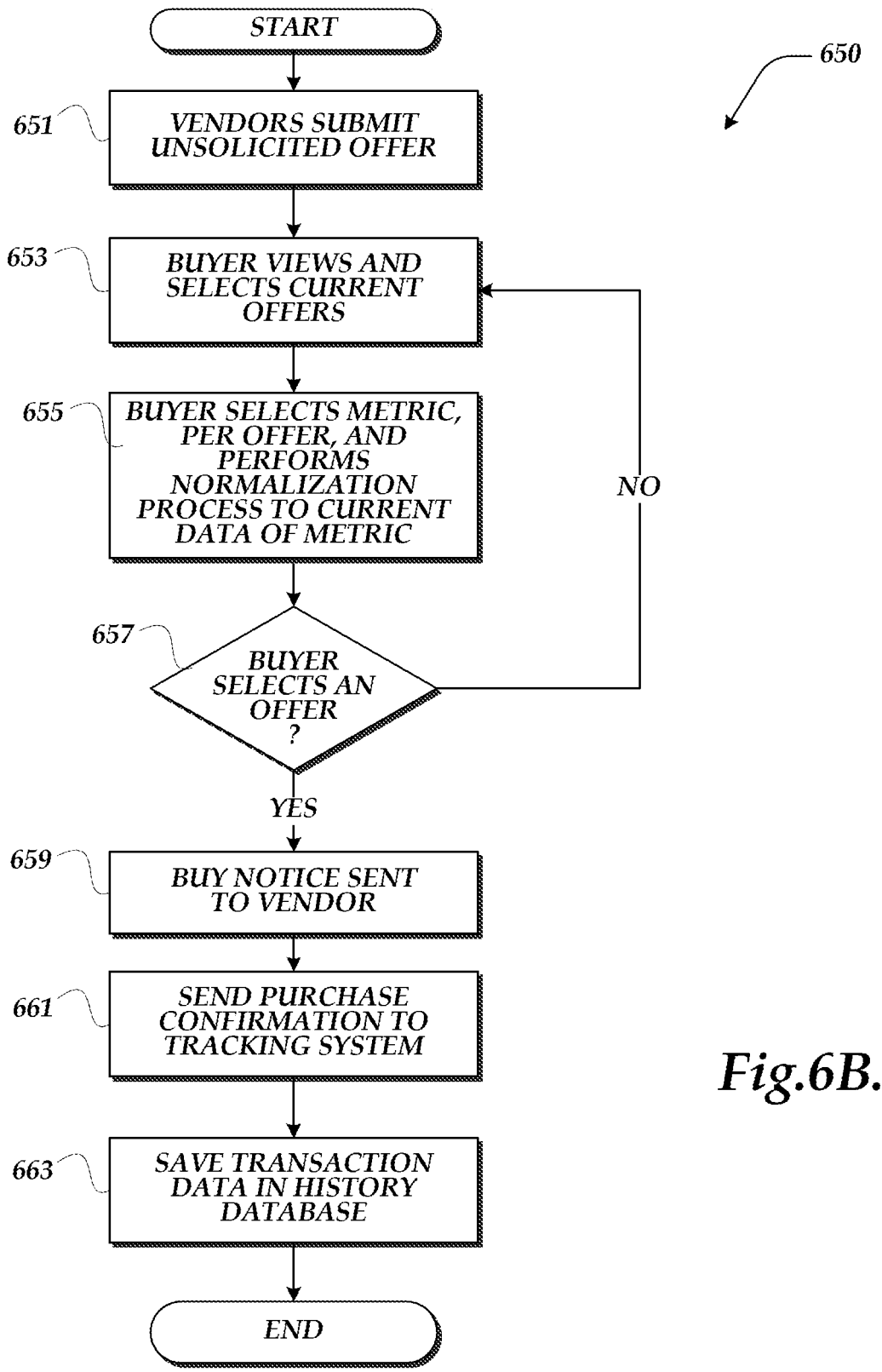

Referring now to FIG. 6B, an embodiment of the unsolicited offer process 650 is disclosed. In summary, the unsolicited offer process 650, also referred to as the unsolicited market purchase process, allows at least one buyer to view unsolicited offers from a plurality of vendors and purchase items from a plurality of vendors from the offers. The logic of FIG. 6B provides buyers with a forum that automatically manages, collects, and normalizes price quotes based on metric data. By the price normalization method of FIG. 6B, the server 230 creates an integrated forum where offers from a plurality of inherently dissimilar products can be obtained and normalized for determination of purchase.

The unsolicited offer process 650 begins at step 651 where the plurality of vendors is able to submit offers to the server 230. This part of the process is executed in a manner similar to step 603 of FIG. 6A, where the vendor submits a quote to the server 230. However, in the Web page of step 651, the server 230 generates a Web page containing several tallies from many different vendors. In addition, at step 651, the server 230 stores all of the unsolicited offer data provided by the vendors.

Next, at step 653, a buyer views the offers stored on the server 230. This part of the process is carried out in a manner similar to the process of step 603 or 607 where the server 230 displays a plurality of offers similar to the tallies depicted in FIG. 8A.

Next, at step 655, the buyer selects a metric for the calculation of the normalized price associated with the selected offer. As described in more detail below, metric data may come from publicly available information, i.e., price of futures contracts traded on the Chicago Mercantile Exchange, subscription services such as Crowes™ or Random Lengths™ accessed via the metric server adapter 435 (shown in FIG. 4), or internally generated metrics derived from the data stored in the server 230. The normalization calculation, otherwise referred to as the normalization process, occurs each time the buyer views a different offer, and the normalization calculation uses the most current metric data for each calculation. The normalization process is carried out because each vendor will most likely offer products that may vary from products of other vendors and have a different tally configuration from those supplied by other vendors. The normalization of the pricing allows the buyers to compare the relative value of the different products offered by the number of vendors. The metric price for each selected offer is displayed in a similar manner as the metric price 815 and 816 shown in the Web page of FIG. 8B.

Next, at decision block 657, the buyer selects at least one offer for purchase. This is similar to the process of FIG. 6A in that the buyer selects the "Buy!" hyperlink 820 associated with the desired tally to purchase an order. The process then continues to steps 659-663, where, at step 659, the process transmits a buy notice to the vendor, then, at step 661, sends a purchase confirmation to the tracking system, and then, at step 663, saves the transaction data in the server database. The steps 659-663 are carried out in the same manner as the steps 615-619 of FIG. 6A. In the above-described process, the buyer notification may include all of the information regarding the specifications by RFQ Line Item, and data such as, but not limited to, the buy price, date, and method of shipment, and the payment terms.

Figure 7:
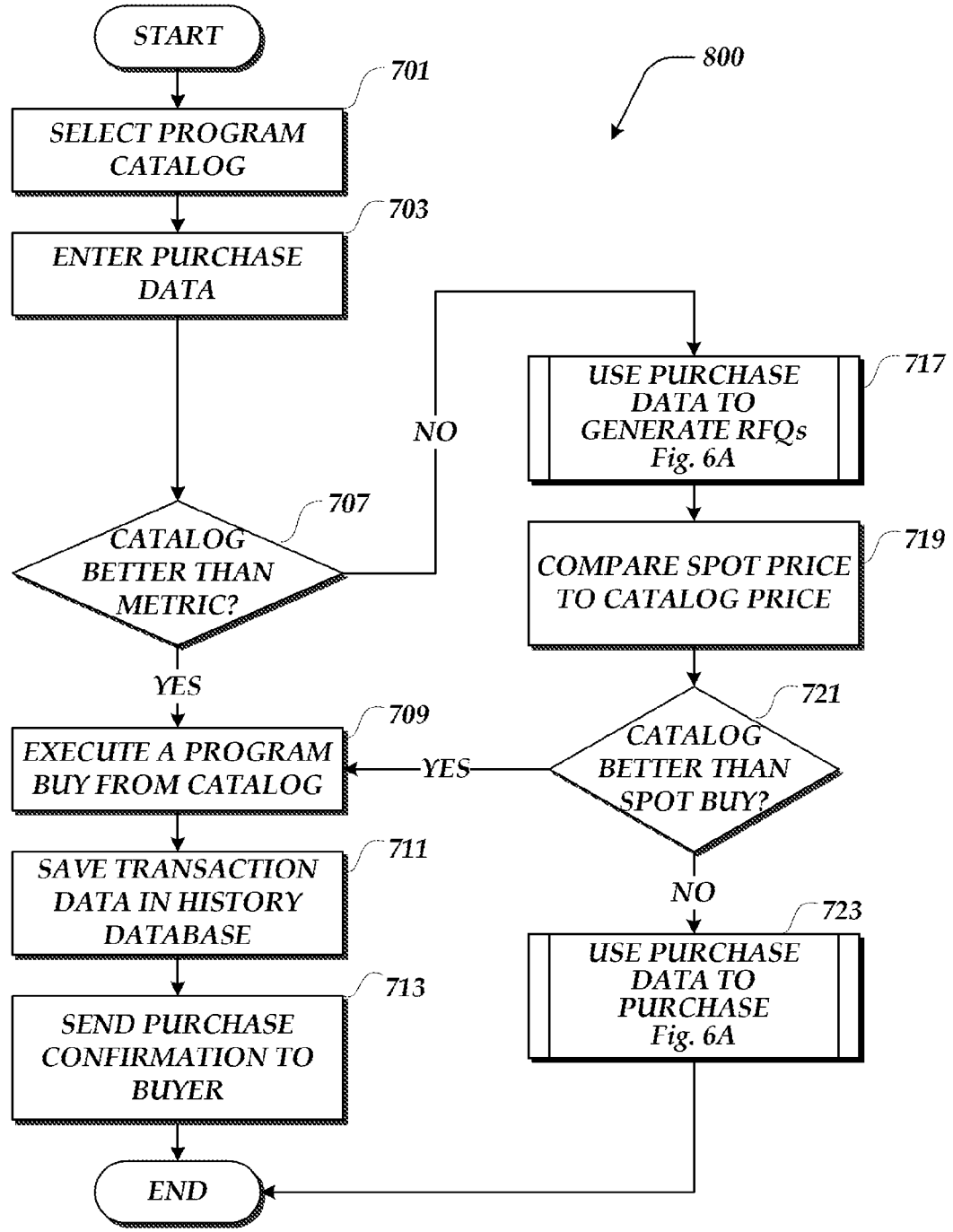
FIG. 7 is a flow diagram illustrating another embodiment of the logic used by the information server to execute the process of a catalog purchase.

Referring now to FIG. 7, a flow diagram illustrating yet another embodiment of the present disclosure is shown. FIG. 7 illustrates the catalog purchase process 700. This embodiment allows buyers to search for a catalog price of desired commerce items, enter their purchase data based on the pre-negotiated catalog prices, and to compare those catalog prices with a selected metric price and the current market price, wherein the current market price is determined by the purchase-negotiation process 600.

The process starts at step 701 where the buyer selects a program buy catalog 443. The program buy catalog 443 provides buyers with the published or pre-negotiated price of the desired products. Next, at step 703, based on the catalog information, the buyer then enters their purchase data. Similar to step 501 of FIG. 5 and the tally shown in FIG. 8A, the buyer sends purchase data to the server 230, such as the desired quantity of each item and the lumber species, grade, etc.

The process then proceeds to decision block 707 where the buyer makes a determination of whether to purchase the items using the catalog price or purchase the desired product in the open market. Here, the server 230 allows the user to make this determination by displaying the metric price of each catalog price. This format is similar to the metric price 815 and 816 displayed in FIG. 8B.

At decision block 707, if the buyer determines that the catalog price is better than a selected metric price, the process then proceeds to steps 709, 711, and 713, where a program buy from the catalog is executed, and the buyer's purchase information is stored on the server 230 and sent to the vendor's system to confirm the sale. These steps 711-713 are carried out in the same manner as the confirmation and save steps 617 and 619 as shown in FIG. 6A.

At decision block 707, if the buyer determines that the metric price is better than the catalog price, the process continues to step 717 where the buyer's purchase data is entered into an RFQ. At this step, the process carries out the first five steps 601-609 of the method of FIG. 6A to provide buyers with the price data from the open market, as well as provide the normalized prices for each open market quote. At step 719, the server 230 then displays a Web page that allows the user to select from a purchase option of a catalog or spot (market) purchase. At decision block 721, based on the displayed information, the buyer will then have an opportunity to make a determination of whether they will proceed with a catalog purchase or an open market purchase.

At decision block 721, if the buyer proceeds with the catalog purchase, the process continues to step 709 where the catalog purchase is executed. Steps 709-713 used to carry out the catalog purchase are the same as if the buyer had selected the catalog purchase in step 707. However, if at decision block 721 the buyer selects the option to proceed with the market purchase, the process continues to step 723 where the RFQ generated in step 717 is sent to the vendor. Here, the process carries out the steps of FIG. 6 to complete the open market purchase. More specifically, the process continues to step 609 where the buyer compares the normalized prices from each vendor. Once a vendor is selected, the negotiation process of steps 603-613 is carried out until the buyer decides to execute the purchase. Next, the transaction steps 615-619 are carried out to confirm the purchase, notify the tracking system, and save the transactional data on the historical database.

Optionally, the process can include a step where the server 230 stores all of the information related to program buy and metric comparisons and the final sales transaction in a historical database. This would allow the server 230 to use all of the transaction information in an analysis process for providing an improved method of obtaining the value of the program. Although the illustrated embodiment is configured to store the data related to the sales transactions, the system can also be configured to store all of the iterative quote information exchanged between the buyer and vendor.

The analysis process allows the server 230 to utilize the sales history records stored in steps 619 and 711 to generate price reports for communication to various third parties as well as provide a means of calculating current market prices for products sold in the above-described methods. The sales history records are also used as the source for a metric, such as those used in the process of FIGS. 6A, 6B, and 7. As shown in steps 619, 663, and 711, the server 230 continually updates the historical database for each sales transaction. The analysis reporting process allows a buyer or manager of buyers to conduct analysis on the historical information. This analysis would include multi-value cross compilation for purposes of determining purchasing strategies, buyer effectiveness, program performance, vendor performance, and measuring effectiveness of forward pricing as a risk management strategy.

Figure 9:
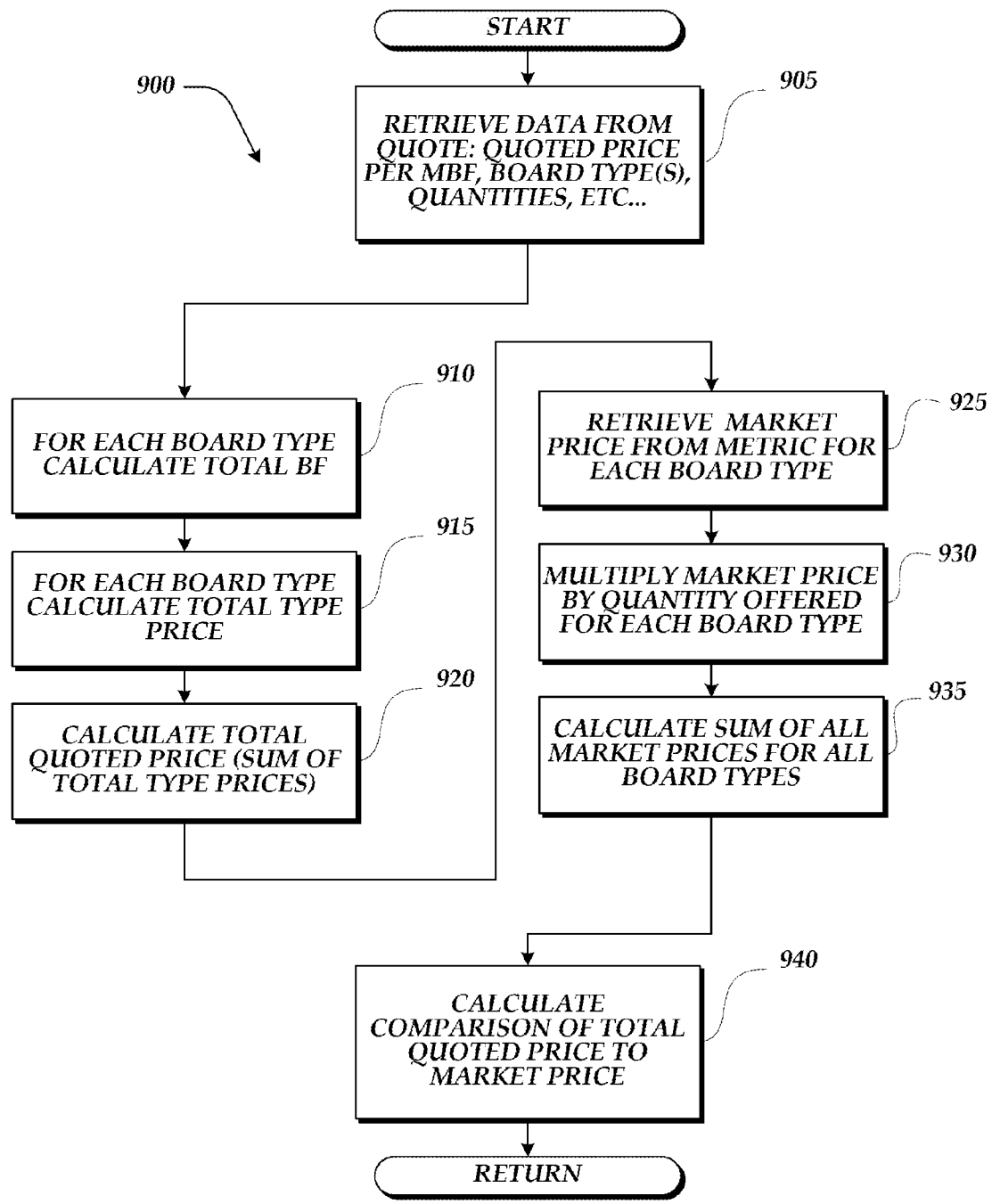
FIG. 9 is a flow diagram illustrating one embodiment of the normalization process described herein.

Referring now to FIG. 9, a flow diagram illustrating the logic of the normalization process 900 is shown. The logic of the normalization process 900 resides on the server 230 and processes the quotes received from commodity sellers. The logic begins at step 905 where quote data is obtained from the seller in response to the buyer's RFQ as described above.

Next, at step 910, routine 900 iteratively calculates the board footage (BF) of each type of lumber. Once all the totals are calculated for each type, routine 900 continues to step 915 where the server 230 calculates the total type price.

At step 915, routine 900 iteratively calculates the total type price for the amount of each type of lumber specified in the quote. This is accomplished by taking the total board footage (BF) calculated in block 910 and multiplying the total BF by the price per MBF specified in the quote. Once all the prices are calculated for each type, routine 900 continues to step 920 where the server 230 calculates the total quoted price. At step 920, the routine 900 calculates the total price for the quote by summing all of the total type prices calculated at step 915.

At step 925, routine 900 iteratively retrieves the most current price for each type of lumber specified in the quote from a predefined metric source(s). Metric data may come from publicly available information, i.e., price of futures contracts traded on the Chicago Mercantile Exchange, subscription service publications such as Crowes™ or Random Lengths™ accessed via the metric server adapter 435 (shown in FIG. 4), or internally generated metrics derived from the server database. Once all the prices are retrieved for each type, at step 930, the routine 900 then iteratively calculates the market price for the quantity of each type of lumber in the quote. Once the totals for all types are calculated, routine 900 continues to step 935 where the routine 900 calculates the total market price for the quote by summing all the most current prices calculated in step 930. Although this example illustrates that steps 910-920 are executed before steps 925-935, these two groups of steps can be executed in any order, or in parallel, so long as they are both executed before a comparison step 940.

At step 940, routine 900 compares the total quoted to the metric price to arrive at a comparative value. In one exemplary embodiment of the current invention, the comparative value is a "percent of metric" value. A value higher than one hundred (100) percent indicates a price that is above the metric rate, and a lower percent indicates a price that is below the metric rate.

The operation of routine 900 can be further illustrated through an example utilizing specific exemplary data. In the example, a buyer sends out a request for a quote (RFQ) requesting a lot of 2×4 S&B lumber consisting of five units of 2"×4"×8', two units of 2"×4"×14', and five units of 2"×4"×16'. The buyer then receives quotes from three sellers. Seller A responds with a tally of six units of 2"×4"×8', four units of 2"×4"×14', and three units of 2"×4"×16' for $287 per thousand board feet. Seller B responds with a lot of five units of 2"×4"×8', one unit of 2"×4"×14', and six units of 2"×4"×16' for $283 per thousand board feet. Seller C responds with a lot of one unit of 2"×4"×8', five units of 2"×4"×14', and five units of 2"×4"×16' for $282 per thousand board feet. Suppose also that the typical unit size is 294 pieces/unit, and the metric or reported market price for 2"×4"×8"s is $287.50, for 2"×4"×14"s is $278.50, and for 2"×4"×16' is $288.

Viewing the MBF prices for the respective quotes is not particularly informative, given that certain lengths of lumber are more desirable and priced accordingly in the marketplace. By processing the quote from Seller A using routine 900, we arrive at a total MBF of 29.792, giving a total quoted price of $8,550.30. The selected metric price for the same types and quantities of lumber would be $8,471.12; therefore, the quoted price would have a percent of market value of 100.93%. Processing the quote from Seller B using routine 900, we arrive at a total MBF of 29.400, giving a total quoted price of $8,320.20. The selected metric price for the same types and quantities of lumber, however, would be $8,437.21; therefore, the quoted price would have a percent of market value of 98.61%. Finally, processing the quote from Seller C using routine 900, we arrive at a total MBF of 30.968, giving a total quoted price of $8,732.98. The selected metric price for the same types and quantities of lumber, however, would be $8,767.66; therefore, the quoted price would have a percent of market value of 99.38%. By looking at the percent of selected metric value, it is apparent that the price from Seller B is a better value. As shown in the methods of FIGS. 5-7, this price normalization process allows users to compare inherently different offers having different quality and quantity values.

In yet another example of an application of the normalization process, additional exemplary data is used to demonstrate the analysis of a transaction having one RFQ from a buyer and two different quotes from a seller, normalized to comparable product of another species. In this example, the buyer produces an RFQ listing the following items: one carload of Eastern SPF (ESPF) lumber having four units of 2"×4"×8', four units of 2"×4"×10', six units of 2"×4"×12', two units of 2"×4"×14', and six units of 2"×4"×16'. The vendor then responds with two different quotes with two different unit tallies and two different prices. The first response lists a quote price of $320 per thousand board feet, and a slight modification of the tally provides four units of 2"×4"×8', four units of 2"×4"×10', six units of 2"×4"×12', three units of 2"×4"×14', and five units of 2"×4"×16'. The second response quotes per the requested tally at a price of $322 per thousand board feet. Both quotes list the delivery location as "Chicago."

To display the quotes, the server 230 produces a Web page similar to that displayed in FIG. 8C, where the vendor's modified tally is displayed in highlighted text. The buyer can then view summary metric comparison or select the hypertext link "View Calculation Detail," which then invokes the server 230 to produce a Web page as shown in FIG. 8D. Referring now to the Web page illustrated in FIG. 8D, the data produced by server 230 compares the response to a selected metric of a different species, Western SPF (WSPF), for items of the same size, grade, and tally. The market price for the same 2×4 tally of ESPF and WSPF are thus simultaneously compared. In an example, Eastern quoted at $322 per thousand board feet, Western metric (Random Lengths™ Jun. 26, 2000 print price plus freight of $80 as defined in Metric Manager) for the same tally being $331.791. This metric comparison is also represented as Quote/Metric Value or Eastern price representing 0.970490, or 97% of comparable Western product.

In review of the normalization process, the buyer must select a metric source for price information for a defined item given a set of attributes, i.e., grade, species, and size. The metric may then be mapped to the RFQ item for comparison and does not have to be the equivalent of the item. For instance, as explained in the above-described example, it may be desirable to map the market relationship of one commodity item to another. The most current pricing data for the metric is electronically moved from the selected source to the server 230. As mentioned above, metric data may come from publicly available information, (i.e., price of futures contracts traded on the Chicago Mercantile Exchange), or subscription services, (i.e., Crowes™ or Random Lengths™ publications), or be an internal metric generated by the server 230. This metric data is used in the normalization process for all calculations, as described with reference to the above-described methods.

While various embodiments of the invention have been illustrated and described, it will be appreciated that within the scope of the appended claims, various changes can be made therein without departing from the spirit of the invention. For example, in an agricultural commodity, an order for Wheat U.S. #2 HRW could be compared to a selected metric of Wheat U.S. #2 Soft White, similar to how different species are analyzed in the above-described example.

The above system and method can be used to purchase other commodity items, such as in the trade of livestock. In such a variation, order information such as a lumber tally would be substituted for a meat type, grade, and cut. Other examples of commodity items include agricultural products, metals, or any other items of commerce having several order parameters.

The invention claimed is:
1. In a networked environment, a system comprising:
a remotely-located server comprising:
   a network interface;
   a non-transitory computer-readable medium having computer-executable instructions stored thereon, wherein the computer-executable instructions, when executed, implement a plurality of components including:
      a metric server adapter;
      a metrics application; and
      at least one communication application; and
   a processor in communication with the network interface and the computer-readable medium, wherein the processor is configured to execute the computer-executable instructions stored in the computer-readable medium;
wherein:
the metric server adapter includes governing logic programmed to manage at least one evaluation service and a plurality of predefined instructions for managing metric data, and to dynamically define transaction-specific instructions for adapting metric data;
the metrics application is a production application programmed to manage one or more purchase and/or analysis processes and to invoke and execute the at least one evaluation service in coordination with the metric server adapter, and to manage one or more user interfaces that, in operation, facilitate interactions with the remotely-located server;
the at least one communication application is programmed to manage one or more protocols that facilitate communications between one or more computing devices and the remotely-located server via the network interface; and
in operation, in response to receipt of a triggering request from a user-agent computing device, the at least one communication application identifies an applicable protocol for communicating with the user-agent computing device and the metrics application receives, from the user-agent computing device, at least one evaluation scenario for analysis, the at least one evaluation scenario identifying one or more buyer-agents, one or more product specification data sets, and at least one particular time or period of time, wherein each product specification data set identifies at least one item that is defined by a plurality of attributes having attribute data that includes two or more parameter values or a plurality of items having a plurality of attributes that differ by at least one parameter value;
wherein receipt of the at least one evaluation scenario triggers the metrics application to invoke the at least one evaluation service which causes the metrics application, for each buyer-agent identified in the at least one evaluation scenario, to:
   retrieve historical purchase data of the buyer agent for the at least one particular time or period of time from one or more memories accessible to the remotely-located server, wherein the retrieved historical purchase data includes one or more price data sets that are responsive to at least one item identified in the one or more product specification data sets, each price data set including price data for the at least one item, and each item possessing a plurality of attributes that include at least one parameter value;
   obtain metric data from at least one data source accessible to the remotely-located server for each price data set, wherein the obtained metric data represents market reference data for at least one responsive item having attributes corresponding to attributes of a respective item as identified in the price data set and includes market reference price data for the at least one particular time or period of time, wherein each responsive item in the metric data possesses a plurality of attributes including at least one parameter value;
   evaluate the plurality of attributes of each responsive item in the metric data relative to the plurality of attributes for the respective item as identified in the price data set to dynamically discover a difference in the attribute data, wherein a discovered difference is disclosed to the metric server adapter which enables the metric server adapter to contextually define transaction-specific instructions for adapting the metric data for the respective item;
   normalize the metric data by executing the transaction-specific instructions for adapting metric data for the respective item, wherein execution of at least one transaction-specific instruction causes one or more adjustment values to be generated and applied to the market reference price data for at least one responsive item that differs by at least one parameter value from the respective item, transforming the market reference price data for the at least one responsive item and automatically producing one or more transaction-specific market reference price data values for the respective item; and
   generate at least one performance metric that pertains to the at least one evaluation service for at least one item identified in the one or more product specification data sets for the at least one particular time or period of time, wherein each performance metric is based, at least in part, on one or a combination of the transaction-specific market reference price data values produced for the respective item as identified in the price data sets associated with each buyer-agent;
wherein the metrics application is further programmed to communicate, in cooperation with the at least one communication application, at least one performance metric generated for each buyer-agent identified in the at least one evaluation scenario, via the network interface, to at least the user-agent computing device.

2. The system of claim 1, wherein invocation of the at least one evaluation service and/or execution of at least one predefined instruction that pertains to the at least one evaluation service causes the metrics application to generate at least one performance metric comprising a comparison value for each buyer-agent identified in the at least one evaluation scenario, wherein the metrics application sums price data for the respective item in each price data set associated with the buyer-agent to determine a summed price total for the at least one item for the particular time or period of time and sums the corresponding transaction-specific market reference price data values produced for the respective item as identified in each price data set to determine a summed market reference price data value total, wherein the comparison value is generated by comparing the summed price total to the summed market reference price data value total.

3. The system of claim 2, wherein invocation of the at least one evaluation service and/or execution of at least one predefined instruction that pertains to the at least one evaluation service further causes the metrics application to measure a difference between the buyer-agent's summed price total for the at least one item for the particular time or period of time and the summed transaction-specific market reference price data values produced for the at least one item, wherein when the summed price total that is less than the sum of the transaction-specific market reference price data values, the performance metric is a measure of the buyer-agent's contribution to gross profit, and when the summed price total is more than the sum of the transaction-specific market reference price data values, the performance metric measures a lost opportunity value.

4. The system of claim 1, wherein invocation of the at least one evaluation service and/or execution of one or more predefined instructions that pertain to the at least one evaluation service causes the metrics application to compare two or more buyer-agents identified in the at least one evaluation scenario using at least one performance metric that is generated for each buyer-agent, and to communicate a result of the comparison to at least the user-agent computing device from which the at least one evaluation scenario was received.

5. The system of claim 1, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, wherein the at least one relationship may include a new or previously unknown relationship.

6. The system of claim 5, wherein the metric server adapter uses the at least one relationship comprising a difference to ascertain which of the predefined instructions for adapting metric data are applicable to the responsive item, wherein the metric server adapter uses the attributes and one or more parameter values of the respective item, in combination with the predefined instructions for adapting metric data ascertained to be applicable to the responsive item, to contextually define transaction-specific instructions for adapting the metric data for the respective item.

7. The system of claim 1, wherein the plurality of predefined instructions for managing metric data include one or more industry-specific instructions or one or more instructions predefined by a user-agent, wherein the coordinated operation of the metrics application and the metric server adapter enables the metric server adapter to autonomously manage the at least one evaluation service and the plurality of predefined instructions for managing metric data and to define transaction-specific instructions for adapting metric data, and wherein execution of the transaction-specific instructions by the metrics application provides an evaluation service that is customized for the user-agent or the industry without custom-coding the computer-executable instructions that comprise the metrics application.

8. The system of claim 1, wherein the metrics application is further programmed to manage, in cooperation with the at least one communication application, one or more user interfaces that, in operation, communicate at least one performance metric generated for at least one buyer-agent, via the network interface, for display on at least the user-agent computing device that identified the at least one evaluation scenario, wherein the one or more user interfaces facilitate interactions that enable the user-agent to expose underlying data in one or more layers of detail, to display additional data in one or more simultaneously displayed pop-up windows, to display linked information or the same data in a different form or representing one or more different buyer-agents or under a different evaluation scenario or using one or more different sources of metric data or as determined at a different time or period of time.

9. The system of claim 1, wherein invocation of the at least one evaluation service and/or execution of at least one predefined instruction that pertains to the at least one evaluation service causes the metrics application to generate at least one performance metric comprising a ratio or index value for each buyer-agent identified in the at least one evaluation scenario, wherein price data associated with the respective item in the price data sets associated with the buyer-agent are combined to determine a volume weighted average of the prices per unit of measure paid by the buyer-agent for the respective item for the particular time or period of time, and further the corresponding transaction-specific market reference price data values produced for the respective item in the price data sets associated with the buyer-agent are combined to determine a volume-weighted average market reference price data value per unit of measure for the respective item for the same particular time or period of time, wherein the average price paid for the respective item by the buyer-agent is divided by the corresponding average market reference price data value produced for the respective item to generate the at least one performance metric.

10. The system of claim 9, wherein invocation of the at least one evaluation service and/or execution of at least one predefined instruction that pertains to the at least one evaluation service causes the metrics application to further generate a combined performance metric, wherein at least one performance metric, comprising a ratio or index value, is automatically inserted in at least one algorithm preassociated with the at least one evaluation service to produce a modified Gross Margin Return on Inventory (GMROI) value, wherein the performance metric uses the volume-weighted average price paid by the buyer-agent to represent the average cost of the respective item, and wherein incorporation of the performance metric into a standard GMROI model provides a combined profitability measure that incorporates both buy-side and sell-side performance.

11. The system of claim 10, wherein the combined performance metric for at least one buyer-agent identified in the at least one evaluation scenario is communicated to the user-agent computing device and further used, at least in part, to evaluate a purchasing strategy for the at least one item identified in at least one product specification data set and/or to measure its effect on gross profit.

12. The system of claim 1, wherein a plurality of evaluation scenarios are received from the user-agent computing device for analysis, wherein at least one evaluation scenario specifies the use of an alternate item, alternate parameter, alternate time or period of time, alternate metric data source, or combination thereof.

13. The system of claim 1, wherein one or more parameter values represent attributes or conditions that are variable for a specific item or transaction.

14. The system of claim 13, wherein the one or more parameter values include at least one of a grade, a rating measure, a species, an item type, a brand, a quantity, a size, a unit of measure, a tally, a shipping or receiving location, a method of delivery, a delivery date, a time of service, a warranty, a payment term, or a transaction type.

15. The system of claim 1, wherein the at least one item identified in the one or more product specification data sets identified in the at least one evaluation scenario represents a specific version or particular form of a physical product or raw material, an intangible product, a service, or a combination thereof.

16. The system of claim 1, wherein at least one item identified in at least one product specification data set or in a retrieved price data set is a bundled or combined item that represents a plurality of items in a packaged product or transaction, a tally, or an assembly of component parts, wherein each item or component part possesses a plurality of attributes having attribute data that differs by at least one parameter value.

17. The system of claim 1, wherein the governing logic comprises a module or application or a separate application layer, wherein the governing logic cohesively manages a plurality of predefined instructions that pertain to the at least one evaluation service, wherein the predefined instructions identify rules or variables or criteria that were predefined and preassociated with the at least one evaluation service, and wherein the predefined instructions serve to identify or modify features or elements that pertain to the at least one evaluation service or to limit at least one functionality of the at least one evaluation service or a feature or element identified therein.

18. The system of claim 1, wherein the metric server adapter is programmed to coordinate a conditional execution of transaction-specific instructions for adapting metric data by the metrics application, including:
one or more formulas operationally combining data values and using variables relating to a plurality of items, attributes, parameters, events, or metric data sources; or
a combination of instructions, including validation rules and/or statistical criteria, relating to a plurality of items, attributes, parameters, vendors, events, metric data sources or the obtained metric data, the conditional execution of which is priority weighted, sequential, recursive, or subject to another method of control defined by the metric server adapter; or
a combined evaluation service that includes a plurality of interdependent transaction-specific instructions for adapting metric data, wherein at least one transaction-specific instruction is further combined with at least one other transaction-specific instruction that specifies employing a process step, action, function, utility, or subroutine, or wherein at least one evaluation service is combined with at least one other evaluation service, wherein the conditional execution of the transaction-specific instructions of the combined evaluation service is priority weighted, sequential, recursive, or subject to another method of control defined by the metric server adapter.

19. The system of claim 1, wherein invocation of the at least one evaluation service and/or execution of at least one predefined instruction that pertains to the at least one evaluation service causes the metric server adapter to define at least one transaction-specific instruction that causes the metrics application to filter each buyer-agent's historic purchase data using one or more predefined control values, criteria, or parameters, and to only retrieve price data sets that satisfy the specified control values, criteria, or parameters.

20. The system of claim 1, wherein at least one evaluation scenario identified by the user-agent causes the metrics application to filter the buyer-agent's historic purchase data and to only retrieve price data sets associated with a particular seller-agent, type of seller-agent, a particular transaction type or transaction size, or purchase data resulting from an executed purchase or contract.

21. The system of claim 1, wherein invocation of the at least one evaluation service and/or execution of at least one predefined instruction that pertains to the at least one evaluation service causes the metrics application to automatically query one or more databases or data sources accessible to the remotely-located server or to monitor one or more data streams to obtain metric data for one or more items responsive to the attributes of at least one item identified in at least one retrieved price data set.

22. The system of claim 1, wherein invocation of the at least one evaluation service and/or execution of at least one predefined instruction that pertains to the at least one evaluation service causes the metrics application to evaluate each responsive item in the metric data for satisfaction of one or more predefined validation rules and/or statistical criteria and to only produce the one or more transaction-specific market reference price data values for the respective item as identified in the price data set using metric data that satisfies the predefined validation rules and/or statistical criteria.

23. The system of claim 1, wherein invocation of the at least one evaluation service and/or execution of at least one predefined instruction that pertains to the at least one evaluation service causes the metric server adapter to define at least one transaction-specific instruction that causes the metrics application to filter, for inclusion or exclusion, the responsive items in the metric data using one or more predefined control values, criteria, or parameters, and to use only a filtered segment of the metric data to produce the one or more transaction-specific market reference price data values for the respective item identified in the price data set.

24. The system of claim 1, wherein invocation of the at least one evaluation service and/or execution of at least one predefined instruction that pertains to the at least one evaluation service causes the metrics application to limit the obtained metric data to market reference price data that represents the same particular time or period of time of each price data set retrieved from the historical purchase data for each identified buyer-agent.

25. The system of claim 1, wherein the transformation of the market reference price data occurs independent of unit-of-measure conversion of data in the metric data for responsive items that are defined by a unit of measure.

26. The system of claim 1, wherein invocation of the at least one evaluation service and/or execution of at least one predefined instruction that pertains to the at least one evaluation service causes the metrics application to consistently convert data expressed in units of measure into standardized or common units of measure, or units of measure as specified for the at least one item identified in the product specification data set, and to only produce the one or more transaction specific market reference price data values for the respective item using data possessing consistent units of measure.

27. The system of claim 1, wherein execution of at least one predefined instruction that pertains to the user-agent and the at least one evaluation service causes the metric application to, at a predefined time or over a predefined interval of time or in response to a triggering event, automatically generate one or more performance metrics for at least one evaluation scenario identified in the at least one predefined instruction, wherein the evaluation scenario identifies one or more buyer-agents, one or more product specification data sets, and at least one particular time or period of time, and wherein the metrics application is further programmed to communicate, in cooperation with the at least one communication application, at least one performance metric for the at least one evaluation scenario, via the network interface, to at least the user-agent computing device that predefined the at least one predefined instruction.

28. The system of claim 1, wherein the metrics application is further programmed to manage at least one user interface that, in operation, configures the remotely-located server to facilitate an integrated data exchange with at least one computing device in communication with the remotely-located server, and to obtain data required by the at least one invoked evaluation service from the computing device in the integrated data exchange, via the network interface, wherein the integrated data exchange does not include a pre-mapped or pre-structured electronic data interchange (EDI) transmission.

29. The system of claim 1, wherein the metrics application is further programmed to manage one or more user interfaces that, in operation, enable the remotely-located server to prompt the user-agent computing device to identify or select at least one data element or function to be added to or removed from a currently in-progress evaluation service, to identify or select at least one parameter value to be added to or removed from the plurality of attributes defined for at least one item identified in the one or more product specification data sets, or to provide additional information required by a currently in-progress evaluation service.

30. The system of claim 1, wherein the at least one evaluation scenario identified by the user-agent causes the metrics application to group two or more buyer-agents identified in the evaluation scenario, wherein the retrieved price data sets include price data sets associated with the group of buyer-agents.

31. The system of claim 1, wherein in response to receipt of a triggering request from the user-agent computing device, the at least one communication application identifies an applicable protocol for communicating with the user-agent computing device and the metrics application manages at least one user interface customized for the user-agent, in coordination with the metric server adapter, wherein the customized user interface includes two or more preconfigured menus preloaded with a plurality of data elements previously defined by the user-agent in one or more predefined instructions managed by the metric server adapter, wherein two or more different data elements are dynamically selected by the user-agent to identify the at least one evaluation scenario for analysis.

32. The system of claim 1, wherein a plurality of evaluation scenarios are compared using at least one performance metric generated for one or more of the buyer-agents identified in each of the plurality of evaluation scenarios, and wherein a result of the comparison is communicated, via the network interface, to at least the user-agent computing device from which the plurality of evaluation scenarios were received.

33. In a networked environment, a system comprising:
a remotely-located server comprising:
  a network interface;
  a non-transitory computer-readable medium having computer-executable instructions stored thereon, wherein the computer-executable instructions, when executed, implement a plurality of components including:
    a metric server adapter;
    a metrics application; and
    at least one communication application; and
  a processor in communication with the network interface and the computer-readable medium, wherein the processor is configured to execute the computer-executable instructions stored in the computer-readable medium;

wherein:
the metric server adapter includes governing logic programmed to manage at least one evaluation service and a plurality of predefined instructions for managing metric data, and to dynamically define transaction-specific instructions for adapting metric data;
the metrics application is a production application programmed to manage one or more purchase and/or analysis processes and to invoke and execute the at least one evaluation service in coordination with the metric server adapter, and to manage one or more user interfaces that, in operation, facilitate interactions with the remotely located server;
the at least one communication application is programmed to manage one or more protocols that facilitate communications between one or more computing devices and the remotely-located server via the network interface; and
in operation, in response to receipt of a triggering request from a buyer-agent computing device, the at least one communication application identifies an applicable protocol for communicating with the buyer-agent computing device and the metrics application receives, from the buyer-agent computing device, at least one evaluation scenario for analysis, the at least one evaluation scenario identifying one or more seller-agents, at least one product specification data set, and at least one particular time or period of time, wherein each product specification data set identifies at least one item that is defined by a plurality of attributes having attribute data that includes two or more parameter values or a plurality of items having a plurality of attributes that differ by at least one parameter value;
wherein receipt of the at least one evaluation scenario triggers the metrics application to invoke the at least one evaluation service which causes the metrics application, for each seller-agent identified in the at least one evaluation scenario, to:
  retrieve historical purchase data of the buyer agent for the at least one particular time or period of time from one or more memories accessible to the remotely-located server, wherein the retrieved historical purchase data is associated with the seller-agent and includes one or more price data sets that are responsive to at least one item identified in the at least one product specification data set, each price data set including price data for the at least one item, and each item possessing a plurality of attributes that include at least one parameter value;
  obtain metric data from at least one data source accessible to the remotely-located server for each price data set, wherein the obtained metric data represents market reference data for at least one responsive item having attributes corresponding to attributes of a respective item as identified in the price data set and includes market reference price data for at least one particular time or period of time, wherein each responsive item in the metric data possesses a plurality of attributes having attribute data that includes at least one parameter value;
  evaluate the plurality of attributes of each responsive item in the metric data relative to the plurality of attributes for the respective item as identified in the price data set to dynamically discover a difference in the attribute data, wherein a discovered difference is disclosed to the metric server adapter which enables the metric server adapter to contextually define transaction-specific instructions for adapting the metric data for the respective item;

normalize the metric data by executing the transaction-specific instructions for adapting metric data for the respective item, wherein execution of at least one transaction-specific instruction causes one or more adjustment values to be generated and applied to the market reference price data for at least one responsive item that differs by at least one parameter value from the respective item, transforming the market reference price data for the responsive item and automatically producing one or more transaction-specific market reference price data values for the respective item; and generate at least one performance metric that pertains to the at least one evaluation service for at least one item identified in the at least one product specification data set for the at least one particular time or period of time, wherein each performance metric is based, at least in part, on one or a combination of the transaction-specific market reference price data values produced for the respective item as identified in the price data sets associated with each seller-agent;

wherein the metrics application is further programmed to communicate, in cooperation with the at least one communications application, at least one performance metric generated for each seller-agent identified in the at least one evaluation scenario, via the network interface, to at least the buyer-agent controlled computing device.

34. The system of claim 33, wherein invocation of the at least one evaluation service and/or execution of at least one predefined instruction that pertains to the at least one evaluation service causes the metrics application to generate at least one performance metric comprising a comparison value for each seller-agent identified in the at least one evaluation scenario, wherein the metrics application sums price data for the respective item in each price data set associated with the seller-agent to determine a summed price total for the at least one item for the particular time or period of time and sums the corresponding transaction-specific market reference price data values produced for the respective item as identified in each price data set to determine a summed market reference price data value total, wherein the comparison value is generated by comparing the summed price total to the summed market reference price data value total.

35. The system of claim 33, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, wherein the at least one relationship may include a new or previously unknown relationship.

36. The system of claim 35, wherein the metric server adapter uses the at least one relationship comprising a difference to ascertain which of the predefined instructions for adapting metric data are applicable to the responsive item, wherein the metric server adapter uses the attributes and one or more parameter values of the respective item, in combination with the predefined instructions for adapting metric data ascertained to be applicable to the responsive item, to contextually define transaction-specific instructions for adapting the metric data for the respective item.

37. The system of claim 33, wherein invocation of the at least one evaluation service and/or execution of at least one predefined instruction that pertains to the at least one evaluation service causes the metrics application to generate at least one performance metric comprising a ratio or index value, wherein price data in the price data sets associated with the seller-agent is combined to determine a volume weighted average of the prices per unit of measure offered by each seller-agent for the respective item for the particular time or period of time and further the corresponding transaction-specific market reference price data values produced for the respective item in each of a plurality of retrieved price data set are combined to determine a volume-weighted average market reference price data value per unit of measure for the respective item for the same particular time or period of time, wherein the average price offered by the seller-agent is divided by the average market reference price data value produced for the at least one item to generate the at least one performance metric.

38. The system of claim 33, wherein invocation of the at least one evaluation service and/or execution of one or more predefined instructions that pertain to the at least one evaluation service causes the metrics application to compare two or more of the identified seller-agents using at least one performance metric that is generated for each seller-agent, and to communicate a result of the comparison to at least the buyer-agent computing device from which the at least one evaluation scenario was received.

39. The system of claim 33, wherein the plurality of predefined instructions for managing metric data include one or more industry-specific instructions or one or more instructions predefined by a buyer-agent, wherein the coordinated operation of the metrics application and the metric server adapter enables the metric server adapter to autonomously manage the at least one evaluation service and the plurality of predefined instructions for managing metric data and to define transaction-specific instructions for adapting metric data, and wherein execution of the transaction-specific instructions by the metrics application provides an evaluation service that is customized for the buyer-agent or the industry without custom-coding the computer-executable instructions that comprise the metrics application.

40. The system of claim 33, wherein the metrics application is further programmed to manage, in coordination with the at least one communication application, one or more user interfaces that, in operation, communicate at least one performance metric generated for at least one seller-agent, via the network interface, for display on at least the buyer-agent computing device that identified the at least one evaluation scenario, wherein the one or more user interfaces facilitate interactions that enable the buyer-agent to expose underlying data in one or more layers of detail, to display additional data in one or more simultaneously displayed pop-up windows, to display linked information or the same data in a different form or representing one or more different seller-agents or under a different evaluation scenario or using one or more different sources of metric data or as determined at a different time or period of time.

41. The system of claim 33, wherein a plurality of evaluation scenarios are identified by the buyer-agent computing device for analysis, wherein at least one scenario specifies the use of an alternate item, alternate parameter, alternate time or period of time, alternate metric data source, or combination thereof.

42. The system of claim 33, wherein one or more parameter values represent attributes or conditions that are variable for a specific item or transaction.

43. The system of claim 42, wherein the one or more parameter values include at least one of a grade, a rating measure, a species, an item type, a brand, a quantity, a size, a unit of measure, a tally, a shipping or receiving location, a method of delivery, a delivery date, a time of service, a warranty, a payment term, or a transaction type.

44. The system of claim 33, wherein the at least one item identified in the at least one product specification data set identified in the at least one evaluation scenario represents a specific version or particular form of a physical product or raw material, an intangible product, a service, or a combination thereof.

45. The system of claim 33, wherein at least one item identified in the at least one product specification data set or in a retrieved price data set is a bundled or combined item that represents a plurality of items in a packaged product or transaction, a tally, or an assembly of component parts, wherein each item or component part possesses a plurality of attributes having attribute data that differs by at least one parameter value.

46. The system of claim 33, wherein the governing logic comprises a module or application or a separate application layer, wherein the governing logic cohesively manages a plurality of predefined instructions that pertain to the at least one evaluation service, wherein the predefined instructions identify rules or variables or criteria that were predefined and preassociated with the at least one evaluation service, and wherein the predefined instructions serve to identify or modify features or elements that pertain to the at least one evaluation service or to limit at least one functionality of the at least one evaluation service or a feature or element identified therein.

47. The system of claim 33, wherein the metric server adapter is programmed to coordinate a conditional execution of transaction-specific instructions for adapting metric data by the metrics application, including:
  one or more formulas operationally combining data values and using variables relating to a plurality of items, attributes, parameters, events, or metric data sources; or
  a combination of instructions, including validation rules and/or statistical criteria, relating to a plurality of items, attributes, parameters, vendors, events, metric data sources or the obtained metric data, the conditional execution of which is priority weighted, sequential, recursive, or subject to another method of control defined by the metric server adapter; or
  a combined evaluation service that includes a plurality of interdependent transaction-specific instructions for adapting metric data, wherein at least one transaction-specific instruction is further combined with at least one other transaction-specific instruction that specifies employing a process step, action, function, utility, or subroutine, or wherein at least one evaluation service is combined with at least one other evaluation service, wherein the conditional execution of the transaction-specific instructions of the combined evaluation service is priority weighted, sequential, recursive, or subject to another method of control defined by the metric server adapter.

48. The system of claim 33, wherein invocation of the at least one evaluation service and/or execution of at least one predefined instruction that pertains to the at least one evaluation service causes the metric server adapter to define at least one transaction-specific instruction that causes the metrics application to filter the buyer-agent's historic purchase data using one or more predefined control values, criteria, or parameters, and to only retrieve price data sets that satisfy the specified control values, criteria, or parameters.

49. The system of claim 33, wherein at least one evaluation scenario identified by the buyer-agent causes the metrics application to filter the buyer-agent's historic purchase data and to only retrieve price data sets associated with a particular transaction type or transaction size, or purchase data resulting from an executed purchase or contract.

50. The system of claim 33, wherein invocation of the at least one evaluation service and/or execution of at least one predefined instruction that pertains to the at least one evaluation service causes the metrics application to automatically query one or more databases or data sources accessible to the remotely-located server or to monitor one or more data streams to obtain metric data for one or more items responsive to the attributes of at least one item identified in at least one retrieved price data set.

51. The system of claim 33, wherein invocation of the at least one evaluation service and/or execution of at least one predefined instruction that pertains to the at least one evaluation service causes the metrics application to evaluate each responsive item in the metric data for satisfaction of one or more predefined validation rules and/or statistical criteria and to only produce the one or more transaction-specific market reference price data values for the respective item as identified in the price data set using metric data that satisfies the predefined validation rules and/or statistical criteria.

52. The system of claim 33, wherein invocation of the at least one evaluation service and/or execution of at least one predefined instruction that pertains to the at least one evaluation service causes the metric server adapter to define at least one transaction-specific instruction that causes the metrics application to filter, for inclusion or exclusion, the responsive items in the metric data using one or more predefined control values, criteria, or parameters, and to use only a filtered segment of the metric data to produce the one or more transaction-specific market reference price data values for the respective item identified in the price data set.

53. The system of claim 33, wherein the transformation of the market reference price data occurs independent of unit-of-measure conversion of data in the metric data for responsive items that are defined by a unit of measure.

54. The system of claim 33, wherein invocation of the at least one evaluation service and/or execution of one or more predefined instructions that pertain to the at least one evaluation service causes the metrics application to consistently convert data expressed in units of measure into standardized or common units of measure, or units of measure as specified for the at least one item identified in the product specification data set, and to only produce the one or more transaction specific market reference price data values for the respective item using data possessing consistent units of measure.

55. The system of claim 33, wherein the at least one evaluation scenario identified by the buyer-agent causes the metrics application to group the historic purchase data of two or more buyer-agents, and wherein the at least one performance metric generated for each seller-agent is based, at least in part, on one or a combination of the transaction-specific market reference price data values produced for the respective item as identified in price data sets associated with the group of buyer-agents.

56. The system of claim 33, wherein invocation of the at least one evaluation service and/or execution of at least one predefined instruction that pertains to the at least one evaluation service causes the metrics application to limit the obtained metric data to market reference price data that represents the same particular time or period of time of each price data set retrieved from the buyer-agent's historical purchase data for each identified seller-agent.

57. The system of claim 33, wherein a plurality of evaluation scenarios identified by the buyer-agent are compared using at least one performance metric generated for one or more of the seller-agents identified in each evaluation scenario, and wherein a result of the comparison is communicated, via the network interface, to at least the buyer-agent computing device from which the plurality of evaluation scenarios were received.

58. The system of claim 33, wherein in response to receipt of a triggering request from the buyer-agent computing device, the at least one communication application identifies an applicable protocol for communicating with the buyer-agent computing device and the metrics application manages at least one user interface customized for the buyer-agent, in coordination with the metric server adapter, wherein the customized user interface includes two or more preconfigured menus preloaded with a plurality of data elements previously defined by the buyer-agent in one or more predefined instructions managed by the metric server adapter, wherein two or more different data elements are dynamically selected by the buyer-agent to identify the at least one evaluation scenario for analysis.

59. In a networked environment, a system comprising:
a remotely-located server comprising:
  a network interface;
  a non-transitory computer-readable medium having computer-executable instructions stored thereon, wherein the computer-executable instructions, when executed, implement a plurality of components including:
    a metric server adapter;
    a metrics application; and
    at least one communication application; and
  a processor in communication with the network interface and the computer-readable medium, wherein the processor is configured to execute the computer-executable instructions stored in the computer-readable medium;
wherein:
the metric server adapter includes governing logic programmed to manage at least one evaluation service and a plurality of predefined instructions for managing metric data, and to dynamically define transaction-specific instructions for adapting metric data;
the metrics application is a production application programmed to manage one or more purchase and/or analysis processes and to invoke and execute the at least one evaluation service in coordination with the metric server adapter, and to manage one or more user interfaces that, in operation, facilitate interactions with the remotely located server;
the at least one communication application is programmed to manage one or more protocols that facilitate communications between one or more computing devices and the remotely-located server via the network interface; and
in operation, in response to receipt of a triggering request from a buyer-agent computing device, the at least one communication application identifies an applicable protocol for communicating with the buyer-agent computing device and the metrics application receives, from the buyer-agent computing device, at least one evaluation scenario for analysis, the at least one evaluation scenario identifying one or more catalogs or pre-negotiated programs, at least one product specification data set, and at least one particular time or period of time, wherein each product specification data set identifies at least one item that is defined by a plurality of attributes having attribute data that includes two or more parameter values or a plurality of items having a plurality of attributes that differ by at least one parameter value;

wherein receipt of the at least one evaluation scenario triggers the metrics application to invoke the at least one evaluation service which causes the metrics application, for each catalog or pre-negotiated program identified in the at least one evaluation scenario, to:
  retrieve historical purchase data of the buyer agent for the at least one particular time or period of time from one or more memories accessible to the remotely-located server, wherein the retrieved historical purchase data is associated with the catalog or pre-negotiated program and includes one or more price data sets that are responsive to at least one item identified in the at least one product specification data set, each price data set including price data for the at least one item, and each item possessing a plurality of attributes that include at least one parameter value;
  obtain metric data from at least one data source accessible to the remotely-located server for each price data set, wherein the obtained metric data represents market reference data for at least one responsive item having attributes corresponding to attributes of a respective item as identified in the price data set and includes market reference price data of for the at least one particular time or period of time, wherein each responsive item in the metric data possesses a plurality of attributes including at least one parameter value;
  evaluate the plurality of attributes of each responsive item in the metric data relative to the plurality of attributes for the respective item as identified in the price data set to dynamically discover a difference in the attribute data, wherein a discovered difference is disclosed to the metric server adapter which enables the metric server adapter to contextually define transaction-specific instructions for adapting the metric data for the respective item;
  normalize the metric data by executing the transaction-specific instructions for adapting metric data for the respective item, wherein execution of at least one transaction-specific instruction causes one or more adjustment values to be generated and applied to the market reference price data for at least one responsive item that differs by at least one parameter value from the respective item, transforming the market reference price data for the responsive item and automatically producing one or more transaction-specific market reference price data values for the respective item; and
  generate at least one performance metric that pertains to the at least one evaluation service for at least one item identified in the at least one product specification data set for the at least one particular time or period of time, wherein each performance metric is based, at least in part, on one or a combination of the transaction specific market reference price data values produced for the respective item as identified in the price data sets associated with each catalog or pre-negotiated program;

wherein the metrics application is further programmed to communicate, in cooperation with the at least one communication application, at least one performance metric for each catalog or pre-negotiated program identified in the at least one evaluation scenario, via the network interface, to at least the buyer-agent computing device.

60. The system of claim 59, wherein invocation of the at least one evaluation service and/or execution of at least one predefined instruction that pertains to the at least one evaluation service causes the metrics application to generate at least one performance metric comprising a comparison value for each catalog or pre-negotiated program identified in the at least one evaluation scenario, wherein the metrics application sums price data for the respective item in each price data set associated with the catalog or the pre-negotiated program to determine a summed price total for the at least one item for the particular time or period of time and sums the corresponding transaction-specific market reference price data values produced for the respective item as identified in each price data set to determine a summed market reference price data value total, wherein the comparison value is generated by comparing the summed price total to the summed market reference price data value total.

61. The system of claim 60, wherein invocation of the at least one evaluation service and/or execution of at least one predefined instruction that pertains to the at least one evaluation service further causes the metrics application to measure a difference between the summed price total for the at least one item for the particular time or period of time and the summed transaction-specific market reference price data values produced for the at least one item, wherein when the summed price total that is less than the sum of the transaction-specific market reference price data values, the performance metric is a measure of the catalog or the pre-negotiated program's contribution to gross profit, and when the summed price total that is more than the sum of the transaction-specific market reference price data values, the performance metric measures a lost opportunity value.

62. The system of claim 59, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, wherein the at least one relationship may include a new or previously unknown relationship.

63. The system of claim 62, wherein the metric server adapter uses the at least one relationship comprising a difference to ascertain which of the predefined instructions for adapting metric data are applicable to the responsive item, wherein the metric server adapter uses the attributes and one or more parameter values of the respective item, in combination with the predefined instructions for adapting metric data ascertained to be applicable to the responsive item, to contextually define transaction-specific instructions for adapting the metric data for the respective item.

64. The system of claim 59, wherein invocation of the at least one evaluation service and/or execution of at least one predefined instruction that pertains to the at least one evaluation service causes the metrics application to generate at least one performance metric comprising a ratio or index value for each catalog or pre-negotiated program identified in the at least one evaluation scenario, wherein price data in the price data sets associated with the catalog or the pre-negotiated program are combined to determine a volume weighted average of the prices per unit of measure paid by the buyer-agent for the respective item for the particular time or period of time, and further the corresponding transaction specific market reference price data values produced for the respective item in the price data sets associated with the catalog or the pre-negotiated program are combined to determine a volume-weighted average market reference price data value per unit of measure for the respective item for the same particular time or period of time, wherein the average price paid for the respective item by the buyer-agent is divided by the corresponding average market reference price data value produced for the respective item to generate the at least one performance metric.

65. The system of claim 64, wherein invocation of the at least one evaluation service and/or execution of at least one predefined instruction that pertains to the at least one evaluation service further causes the metrics application to automatically flag each catalog or pre-negotiated program with a performance metric greater than one for review and/or re-negotiation before communicating the at least one performance metric generated for each identified catalog or pre-negotiated program to the buyer-agent computing device.

66. The system of claim 59, wherein the plurality of predefined instructions for managing metric data include one or more industry-specific instructions or one or more instructions predefined by a buyer-agent, wherein the coordinated operation of the metrics application and the metric server adapter enables the metric server adapter to autonomously manage the at least one evaluation service and the plurality of predefined instructions for managing metric data and to define transaction-specific instructions for adapting metric data, and wherein execution of the transaction-specific instructions by the metrics application provides an evaluation service that is customized for the buyer-agent or the industry without custom-coding the computer-executable instructions that comprise the metrics application.

67. The system of claim 59, wherein the metrics application is further programmed to manage, in coordination with the at least one communication application, one or more user interfaces that, in operation, communicate at least one performance metric generated for at least one buyer-agent, via the network interface, for display on at least the buyer-agent computing device that identified the at least one evaluation scenario, wherein the one or more user interfaces facilitate interactions that enable the buyer-agent to expose underlying data in one or more layers of detail, to display additional data in one or more simultaneously displayed pop-up windows, to display linked information or the same data in a different form or representing one or more different catalogs or pre-negotiated programs or using one or more different sources of metric data or as determined at a different time or period of time.

68. The system of claim 59, wherein one or more parameter values represent attributes or conditions that are variable for a specific item or transaction.

69. The system of claim 68, wherein the one or more parameter values include at least one of a grade, a rating measure, a species, an item type, a brand, a quantity, a size, a unit of measure, a tally, a shipping or receiving location, a method of delivery, a delivery date, a time of service, a warranty, a payment term, or a transaction type.

70. The system of claim 59, wherein at least one item identified in the at least one product specification data set or in a retrieved price data set is a bundled or combined item that represents a plurality of items in a packaged product or transaction, a tally, or an assembly of component parts, wherein each item or component part possesses a plurality of attributes having attribute data that differs by at least one parameter value.

71. The system of claim 59, wherein the governing logic comprises a module or application or a separate application layer, wherein the governing logic cohesively manages a plurality of predefined instructions that pertain to the at least one evaluation service, wherein the predefined instructions identify rules or variables or criteria that were predefined and preassociated with the at least one evaluation service, and wherein the predefined instructions serve to identify or modify features or elements that pertain to the at least one evaluation service or to limit at least one functionality of the at least one evaluation service or a feature or element identified therein.

72. The system of claim 59, wherein the metric server adapter is programmed to coordinate a conditional execution of transaction-specific instructions for adapting metric data by the metrics application, including:
one or more formulas operationally combining data values and using variables relating to a plurality of items, attributes, parameters, events, or metric data sources; or
a combination of instructions, including validation rules and/or statistical criteria, relating to a plurality of items, attributes, parameters, vendors, events, metric data sources or the obtained metric data, the conditional execution of which is priority weighted, sequential, recursive, or subject to another method of control defined by the metric server adapter; or
a combined evaluation service that includes a plurality of interdependent transaction-specific instructions for adapting metric data, wherein at least one transaction-specific instruction is further combined with at least one other transaction-specific instruction that specifies employing a process step, action, function, utility, or subroutine, or wherein at least one evaluation service is combined with at least one other evaluation service, wherein the conditional execution of the transaction-specific instructions of the combined evaluation service is priority weighted, sequential, recursive, or subject to another method of control defined by the metric server adapter.

73. The system of claim 59, wherein invocation of the at least one evaluation service and/or execution of at least one predefined instruction that pertains to the at least one evaluation service causes the metric server adapter to define at least one transaction-specific instruction that causes the metrics application to filter the buyer-agent's historic purchase data using one or more predefined control values, criteria, or parameters, and to only retrieve price data sets that satisfy the specified control values, criteria, or parameters.

74. The system of claim 59, wherein the metrics application is further programmed to manage at least one user interface that, in operation, configures the remotely-located server to facilitate an integrated data exchange with at least one computing device in communication with the remotely-located server, and to obtain data required by the at least one invoked evaluation service from the computing device in the integrated data exchange, via the network interface, wherein the integrated data exchange does not include a pre-mapped or pre-structured electronic data interchange (EDI) transmission.

75. The system of claim 59, wherein the metrics application is further programmed to manage one or more user interfaces that, in operation, enable the remotely-located server to prompt the buyer-agent computing device to identify or select at least one data element or function to be added to or removed from a currently in-progress evaluation service, to identify or select at least one parameter value to be added to or removed from the plurality of attributes defined for at least one item identified in the at least one product specification data set, or to provide additional information required by a currently in-progress evaluation service.

76. The system of claim 59, wherein the at least one evaluation scenario identified by the buyer-agent causes the metrics application to group the historic purchase data of two or more buyer-agents, and wherein the at least one performance metric generated for each identified catalog or pre-negotiated program is based, at least in part, on one or a combination of the transaction specific market reference price data values produced for the respective item as identified in price data sets associated with the group of buyer-agents.

77. The system of claim 59, wherein the price data for the at least one item identified in at least one catalog or pre-negotiated program is defined as a formula.

78. The system of claim 59, wherein a plurality of evaluation scenarios are identified by the buyer-agent computing device for analysis, wherein each evaluation scenario identifies the same at least one product specification data set and the same at least one particular time or period of time, but defines a different formula with which to derive price data for at least one item in one or more identified catalogs or pre-negotiated programs, wherein the plurality of evaluation scenarios are compared using the at least one performance metric generated for each catalog or pre-negotiated program identified in each of the plurality of evaluation scenarios, and wherein a result of the comparison is communicated, via the network interface, to at least the buyer-agent computing device from which the plurality of evaluation scenarios were received.

79. The system of claim 78, wherein the comparison communicated to the buyer-agent computing device is further used, at least in part, to model or select a buyer-agent preferred formula for defining price data for the at least one item included in at least one catalog or pre-negotiated program.

80. The system of claim 59, wherein in response to receiving a triggering request from the buyer-agent computing device, the at least one communication application identifies an applicable protocol for communicating with the buyer-agent computing device and triggers the metrics application to manage at least one user interface customized for the buyer-agent, in coordination with the metric server adapter, wherein the customized user interface includes two or more preconfigured menus preloaded with a plurality of data elements previously defined by the buyer-agent in one or more predefined instructions managed by the metric server adapter, wherein two or more different data elements are dynamically selected by the user-agent to identify the at least one evaluation scenario for analysis.

81. In a networked environment, a system comprising:
a remotely-located server comprising:
a network interface;
a non-transitory computer-readable medium having computer-executable instructions stored thereon, wherein the computer-executable instructions, when executed, implement a plurality of components including:

a metric server adapter;
a metrics application; and
at least one communication application; and
a processor in communication with the network interface and the computer-readable medium, wherein the processor is configured to execute the computer-executable instructions stored in the computer-readable medium;

wherein:
the metric server adapter includes governing logic programmed to manage at least one evaluation service and a plurality of predefined instructions for managing metric data, and to dynamically define transaction-specific instructions for adapting metric data;
the metrics application is a production application programmed to manage one or more purchase and/or analysis processes and to invoke and execute the at least one evaluation service in coordination with the metric server adapter, and to manage one or more user interfaces that, in operation, facilitate interactions with the remotely-located server;
the at least one communication application is programmed to manage one or more protocols that facilitate communications between one or more computing devices and the remotely-located server via the network interface; and
in operation, at a predefined time or over a predefined interval of time or in response to a triggering event, the metrics application automatically invokes the at least one evaluation service and configures the remotely-located server to receive at least one transaction data set from a user-agent computing device or to retrieve data representing at least one transaction data set from one or more databases accessible to the remotely-located server for analysis, wherein each received or retrieved transaction data set identifies a product specification data set associated with a buyer-agent and a price data set associated with a seller-agent, each side of the transaction data set identifying at least one item that is defined by a plurality of attributes having attribute data that includes two or more parameter values or a plurality of items having a plurality of attributes that differ by at least one parameter value;
wherein receipt or retrieval of at least one transaction data set further causes the metrics application, for at least one side of each received or retrieved transaction data set, to:
obtain metric data from at least one data source accessible to the remotely-located server, wherein the obtained metric data represents market reference data for at least one responsive item having attributes that correspond to attributes of a respective item as identified in the product specification data set or the price data set of the transaction data set and includes market reference price data of a current time or period of time, wherein each responsive item in the metric data possesses a plurality of attributes including at least one parameter value;
evaluate the plurality of attributes of each responsive item in the metric data relative to the plurality of attributes for the respective item as identified in the product specification data set or the price data set to dynamically discover a difference in the attribute data, wherein a discovered difference is disclosed to the metric server adapter which enables the metric server adapter to contextually define transaction-specific instructions for adapting the metric data for the respective item;
normalize the metric data by executing the transaction-specific instructions for adapting metric data for the respective item, wherein execution of at least one transaction-specific instruction causes one or more adjustment values to be generated and applied to the market reference price data for at least one responsive item that differs by at least one parameter value from the respective item, transforming the market reference price data for the at least one responsive item and automatically producing one or more transaction-specific market reference price data values for the respective item; and
generate one or more performance metrics that pertain to the at least one evaluation service for at least one item identified in the product specification data set and/or the price data set, wherein each performance metric is based, at least in part, on one or a combination of the transaction-specific market reference price data values produced for the respective item as identified in the product specification data set or the price data set;
wherein the metrics application is further programmed to communicate, in cooperation with the at least one communication application, at least one performance metric for at least one side of each received or retrieved transaction data set, via the network interface, to at least the user-agent computing device or at least one output identified in at least one predefined instruction that pertains to the at least one evaluation service.

82. The system of claim 81, wherein the metrics application is separate from the metric server adapter, and wherein coordinated operation of the metrics application with the metric server adapter enables the metrics application to algorithmically process the attribute data to dynamically identify at least one relationship comprising a difference within the attribute data, wherein the at least one relationship may include a new or previously unknown relationship.

83. The system of claim 82, wherein the metric server adapter uses the at least one relationship comprising a difference to ascertain which of the predefined instructions for adapting metric data are applicable to the responsive item, wherein the metric server adapter uses the attributes and one or more parameter values of the respective item, in combination with the predefined instructions for adapting metric data ascertained to be applicable to the responsive item, to contextually define transaction-specific instructions for adapting the metric data for the respective item.

84. The system of claim 81, wherein the plurality of predefined instructions for managing metric data include one or more industry-specific instructions or one or more instructions predefined by a user-agent, wherein the coordinated operation of the metrics application and the metric server adapter enables the metric server adapter to autonomously manage the at least one evaluation service and the plurality of predefined instructions for managing metric data and to define transaction-specific instructions for adapting metric data, and wherein execution of the transaction-specific instructions by the metrics application provides an evaluation service that is customized for the user-agent or the industry without custom-coding the computer-executable instructions that comprise the metrics application.

85. The system of claim 81, wherein the metrics application is further programmed to manage, in coordination with the at least one communication application, one or more user interfaces that, in operation, communicate at least one performance metric generated for at least one side of the at least one received or retrieved transaction data set, via the network interface, for display on at least one computing device in communication with the remotely-located server, wherein the one or more user interfaces facilitate interactions that enable the user-agent to expose underlying data in one or more layers of detail, to display additional data in one or more simultaneously displayed pop-up windows, to display linked information or the same data in a different form or using one or more different sources of metric data or as determined for a different time or period of time.

86. The system of claim 81, wherein invocation of the at least one evaluation service and/or execution of at least one predefined instruction that pertains to the at least one evaluation service causes the metrics application to automatically communicate one or more performance metrics generated for at least one side of the transaction data set to a buyer-agent associated with the product specification data set and/or a seller-agent associated with the price data set.

87. The system of claim 81, wherein invocation of the at least one evaluation service and/or execution of at least one predefined instruction that pertains to the at least one evaluation service causes the metrics application generate at least one performance metric comprising a measure of change between one or more of the performance metrics currently generated for the respective item and the corresponding one or more performance metrics as generated for the respective item at a previous time or period of time, and to communicate the at least one performance metric comprising a measure of the change to at least the user-agent computing device from which the at least one transaction data set was received or at least one output identified in at least one predefined instruction that pertains to the at least one evaluation service.

88. The system of 87, wherein the measure of the change is represented as monetary value, a percent of change, or as an index or ratio value.

89. The system of claim 87, wherein the communicated performance metric comprising a measure of the change is used by a third-party payment processor, a credit provider, or a clearing organization to account for collateral or a margin required of the buyer-agent or the seller-agent associated with the received or retrieved transaction data set.

90. The system of claim 81, wherein invocation of the at least one evaluation service and/or execution of at least one predefined instruction that pertains to the at least one evaluation service causes the metrics application to communicate one or more performance metrics generated for at least one side of at least one received or retrieved transaction data set to a third-party payment or credit processor, a clearing organization, a regulatory body, or a tracking system.

91. The system of claim 81, wherein one or more parameter values represent attributes or conditions that are variable for a specific item or transaction.

92. The system of claim 91, wherein the one or more parameter values include at least one of a grade, a rating measure, a species, an item type, a brand, a quantity, a size, a unit of measure, a tally, a shipping or receiving location, a method of delivery, a delivery date, a time of service, a warranty, a payment term, or a transaction type.

93. The system of claim 92, wherein delivery comprises a financial delivery.

94. The system of claim 92, wherein the delivery date or time of service specifies one or more fulfillment dates in the future, and comprises a forward price transaction type.

95. The system of claim 92, wherein delivery comprises an exchange of at least one item for at least one other item, wherein the at least one other item differs by at least one parameter value from the at least one item.

96. The system of claim 92, wherein a payment term includes a credit term.

97. The system of claim 81, wherein a current time or period of time includes a continuously sliding interval of time that represents a most current period of time.

98. The system of claim 81, wherein invocation of the at least one evaluation service and/or execution of at least one predefined instruction that pertains to the at least one evaluation service causes the metrics application to generate at least one performance metric that encompasses a series of times, periods of time, and/or delivery dates, wherein the series of times, periods of time, and/or delivery dates can include one or more times in the future.

99. The system of claim 81, wherein the received or retrieved transaction data set represents a consummated transaction.

100. The system of claim 81, wherein at least one item identified in the at least one received or retrieved transaction data set is a bundled or combined item that represents a plurality of items comprising a packaged product or transaction, a tally, or an assembly of component parts, wherein each item or component part possesses a plurality of attributes having attribute data that differs by at least one parameter value from that of another item or component part of the bundled or combined item.

101. The system of claim 100, wherein invocation of the at least one evaluation service and/or execution of at least one predefined instruction that pertains to the at least one evaluation service causes the metrics application to subdivide the plurality of items or the assembly of component parts into a plurality of segments, wherein the metrics application generates at least one performance metric for one or more of the segments of the bundled or combined item.

102. The system of claim 81, wherein invocation of the at least one evaluation service and/or execution of at least one predefined instruction that pertains to the at least one evaluation service causes the metrics application to generate a performance metric comprising a measure the value of the difference between price data associated with the respective item in the transaction data set and one or a combination of the transaction specific market reference price data values produced for the respective item.

103. The system of claim 81, wherein invocation of the at least one evaluation service and/or execution of at least one predefined instruction that pertains to the at least one evaluation service causes the metrics application to compare at least one performance metric generated for the respective item as identified in the product specification data set with price data associated with the respective item in the price data set, and to communicate a result of the comparison to at least the user-agent computing device from which the at least one transaction data set was received or at least one output identified in at least one predefined instruction that pertains to the at least one evaluation service.

104. The system of claim 81, wherein invocation of the at least one evaluation service and/or execution of at least one predefined instruction that pertains to the at least one evaluation service causes the metrics application to compare price data associated with the respective item in the price data set with one or more of the performance metrics generated for the respective item as identified in the price data set, and to communicate a result of the comparison to at least the user-agent computing device from which the at least one transaction data set was received or at least one output predefined in at least one predefined instruction that pertains to the at least one evaluation service.

105. The system of claim 81, wherein invocation of the at least one evaluation service and/or execution of at least one predefined instruction that pertains to the at least one evaluation service causes the metrics application to compare one or more performance metrics generated for the respective item as identified in the product specification data set to one or more of the performance metrics generated for the respective item as identified in the price data set of the transaction data set, and to communicate a result of the comparison to at least the user-agent computing device from which the at least one transaction data set was received or at least one output identified in at least one predefined instruction that pertains to the at least one evaluation service.

106. The system of claim 81, wherein invocation of the at least one evaluation service and/or execution of at least one predefined instruction that pertains to the at least one evaluation service causes the metrics application to compare one or more of the performance metrics generated for at least one item as identified in at least one side of the received or retrieved transaction data set to one or more corresponding performance metrics previously generated for the at least one item, a predefined base market value, or one or more current market values reported by an exchange or trading venue or a third-party price reporting service for the at least one item, and to communicate, via the network interface, a result of the comparison to at least the user-agent computing device from which the at least one transaction data set was received or at least one output identified in at least one predefined instruction that pertains to the at least one evaluation service.

107. The system of claim 81, wherein invocation of the at least one evaluation service and/or execution of at least one predefined instruction that pertains to the at least one evaluation service causes the metrics application, at a predefined time or over a predefined interval of time or in response to a triggering event, to obtain more current metric data for the respective item identified in at least one side of the received or retrieved transaction data set, wherein the more current metric data represents market reference data for at least one responsive item having attributes that correspond to attributes of the respective item, and includes more-current market reference price data or excludes previously-obtained metric data that is no longer responsive to the respective item or no longer represents current market reference price data associated with the respective item, and further causes the metrics application, in coordination with the metric server adapter, to produce one or more more-current transaction-specific market reference price data values for the respective item and to generate one or more more-current performance metrics for the respective item as identified in at least one side of the received or retrieved transaction data set, and to communicate the at least one more-current performance metric, via the network interface, to at least the user-agent computing device from which the at least one transaction was received or at least one output identified in at least one predefined instruction that pertains to the at least one evaluation service.

108. The system of claim 81, wherein the at least one communicated performance metric represents a current market value for the respective item as identified in at least one side of the received or retrieved transaction data set.

109. The system of claim 81, wherein invocation of the at least one evaluation service and/or execution of at least one predefined instruction that pertains to the at least one evaluation service causes the metrics application to automatically generate at least one more current performance metric for at least one side of all open transaction data sets, including not yet fulfilled or delivered or executed transactions.

110. The system of claim 81, wherein invocation of the at least one evaluation service and/or execution of at least one predefined instruction that pertains to the at least one evaluation service causes the metrics application to automatically generate at least one more current performance metric for the at least one item as identified in the product specification data set and/or the price data set of all consummated transaction data sets evaluated by the at least one evaluation service at the predefined time or over the predefined interval of time.

111. The system of claim 81, wherein invocation of the at least one evaluation service and/or execution of at least one predefined instruction that pertains to the at least one evaluation service causes the metrics application to produce a composite market reference price data value for the respective item, wherein two or more transaction specific market reference price data values produced for the respective item are combined using a function or algorithm preassociated with the at least one evaluation service to produce the composite market reference price data value for the respective item.

112. The system of claim 81, wherein invocation of the at least one evaluation service and/or execution of at least one predefined instruction that pertains to the at least one evaluation service causes the metrics application to generate at least one relative value metric, wherein price data associated with the respective item is divided by one or a combination of the transaction-specific market reference price data values produced for the respective item or at least one performance metric generated for the respective item, to generate a ratio or index value.

113. The system of claim 81, wherein at least one performance metric generated for the respective item comprises a range of values, wherein the range of values is based, at least in part, on two or more transaction-specific market reference price data values produced for the respective item.

114. The system of claim 81, wherein the metric server adapter is programmed to coordinate a conditional execution of transaction-specific instructions for adapting metric data by the metrics application, including:
  one or more formulas operationally combining data values and using variables relating to a plurality of items, attributes, parameters, events, or metric data sources; or
  a combination of instructions, including validation rules and/or statistical criteria, relating to a plurality of items, attributes, parameters, vendors, events, metric data sources or the obtained metric data, the conditional execution of which is priority weighted, sequential, recursive, or subject to another method of control defined by the metric server adapter; or
  a combined evaluation service that includes a plurality of interdependent transaction-specific instructions for adapting metric data, wherein at least one transaction-specific instruction is further combined with at least one other transaction-specific instruction that specifies employing a process step, action, function, utility, or subroutine, or wherein at least one evaluation service is combined with at least one other evaluation service, wherein the conditional execution of the transaction-specific instructions of the combined evaluation service is priority weighted, sequential, recursive, or subject to another method of control defined by the metric server adapter.

115. The system of claim 81, wherein the metrics application is further programmed to manage at least one user interface that, in operation, configures the remotely-located server to facilitate data communication in XML format, enabling the metrics application, in cooperation with the at least one communication application, to dynamically change, dynamically route, and/or pre-configure data for movement of the data in an integrated data exchange.

116. The system of claim 81, wherein price data for the respective item as identified in the product specification data set and/or the price data set of a received or retrieved transaction data set is specified as a formula, wherein the specified formula is to be implemented at one or more specified times or intervals of time in the future using, at least in part, one or more transaction-specific market reference price data values produced for the respective item by the remotely-located server or one or more prices reported by a specified source of market reference price data, wherein at a specified time or interval of time the metrics application automatically derives the price data for the respective item in accordance with the specified formula.

117. The system of claim 81, wherein the metrics application is further programmed to manage, in cooperation with the at least one communication application, one or more user interfaces that, in operation, enable the remotely-located server to prompt a user-agent computing device to identify or select at least one data element or function to be added to or removed from a currently in-progress evaluation service, to identify or select at least one different parameter value for a respective item as identified in the received or retrieved transaction data set, or to provide additional information required by a currently in-progress evaluation service.

118. The system of claim 81, wherein invocation of the at least one evaluation service and/or execution of at least one predefined instruction that pertains to the at least one evaluation service causes the metric server adapter to define at least one transaction-specific instruction that, when executed, causes the metrics application to obtain metric data for an alternate item, wherein the alternate item is a substitute item or differs by at least one parameter value from the respective item as identified in the received or retrieved transaction data set, and further causes the metrics application, in coordination with the metric server adapter, to produce one or more transaction-specific market reference price data values for the respective item using, at least in part, metric data obtained for the alternate item.

119. The system of claim 81, wherein invocation of the at least one evaluation service and/or execution of at least one predefined instruction that pertains to the at least one evaluation service causes the metric server adapter to define at least one transaction-specific instruction that causes the metrics application to filter, for inclusion or exclusion, the one or more responsive items in the metric data using one or more predefined control values, criteria, or parameters, and to use only a limited or filtered segment of the metric data to produce the one or more transaction-specific market reference price data values for the respective item.

120. The system of claim 81, wherein invocation of the at least one evaluation service and/or execution of at least one predefined instruction that pertains to the at least one evaluation service causes the metrics application to obtain only metric data resulting from a computer-based interaction and/or to use only electronically-created metric data to produce the one or more transaction-specific market reference price data values for the respective item, wherein the electronically-created metric data does not include human-reported transaction data or transaction data that was manually transcribed into a digital format, and wherein the electronically-created metric data includes data comprising a timestamp that identifies a particular time or period of time.

121. The system of claim 81, wherein invocation of the at least one evaluation service and/or execution of at least one predefined instruction that pertains to the at least one evaluation service causes the metrics application to evaluate each responsive item in the metric data for satisfaction of one or more predefined validation rules and/or statistical criteria and to only produce the one or more transaction-specific market reference price data values for the respective item using metric data that satisfies the predefined validation rules and/or statistical criteria.

122. The system of claim 81, wherein the at least one item identified in at least one side of the received or retrieved transaction data set represents a specific version or particular form of a physical product or raw material, an intangible product, a service, or a combination thereof.

123. The system of claim 81, wherein the metrics application is programmed to manage one or more user interfaces that, in operation, enable a user-agent computing device to predefine, for exclusive use by a user-agent associated with the user-agent computing device, at least one instruction for managing metric data or to modify at least one previously predefined instruction for managing metric data and to preassociate the at least one predefined or modified instruction with at least one evaluation service, wherein the remotely-located server stores the at least one user-agent predefined or modified instruction in a memory accessible to the remotely-located server for retrieval by the metric server adapter when the at least one evaluation service is invoked by the metrics application.

124. The system of claim 81, wherein the metrics application is further programmed to manage one or more user interfaces that, in operation, enable a user-agent to predefine an item by a plurality of attributes including one or more parameter values and further enable the predefined item to be preassociated with one or more evaluation services, wherein the attributes are stored in association with the predefined item in a memory accessible to the remotely-located server and automatically associated with the item by the metric server adapter when the at least one evaluation service is invoked by the metrics application.

125. The system of claim 124, wherein the metrics application is further programmed to manage one or more user interfaces that, in operation, enable a user-agent to predefine an item and to further preassociate the item with one or more other predefined items, item attributes, parameters, data storages or data sources, or vendors, or events, and/or with one or more other predefined instructions, collectively forming a compound, grouped, or multi-variant data element.

126. The system of claim 125, wherein at least one instruction for managing metric data that was predefined by the user-agent further associates a unique label or code with the predefined compound, grouped, or multi-variant data element, wherein in response to identification of the unique label or code, the metric server adapter automatically applies the one or more predefined instructions that collectively form the compound, grouped, or multi-variant data element.

127. The system of claim 81, wherein at least one industry-specific performance metric is predefined in the form of at least one algorithm that was preassociated with the at least one evaluation service.

128. The system of claim 81, wherein invocation of the at least one evaluation service and/or execution of at least one transaction-specific instruction that pertains to the at least one evaluation service causes the metrics application, in coordination with the metric server adapter, to generate at least one adjustment value for a responsive item with a parameter value that differs from a corresponding parameter value as identified for the respective item using one or more predefined algorithms, including a least squares or a curve-fit algorithm, preassociated with the at least one evaluation service, wherein the at least one adjustment value minimizes a difference between the responsive item with the differing parameter and an average value derived from market reference price data of a control group having attributes that corresponds to the parameter value of the respective item, wherein the at least one adjustment value is applied to the market reference price data associated with the responsive item.

129. The system of claim 81, wherein the transformation of the market reference price data occurs independent of unit-of-measure conversion of data in the metric data for responsive items that are defined by a unit of measure.

130. The system of claim 81, wherein invocation of the at least one evaluation service and/or execution of one or more predefined instructions that pertain to the at least one evaluation service causes the metrics application to consistently convert data expressed in units of measure into standardized or common units of measure, or units of measure as specified for the respective item as identified in the product specification data set or the price data set, and to only produce the one or more transaction specific market reference price data values for the respective item using data possessing consistent units of measure.

131. The system of claim 81, wherein the at least one communication application, when executed, implements a set of protocols for networked communication that, in operation, eliminate device-specific dependencies, location-specific dependencies, or application-specific dependencies.

132. The system of claim 81, wherein the at least one communication application, when executed, implements a web server.

133. The system of claim 81, wherein the metrics application is further programmed to manage, in cooperation with the at least one communication application, one or more user interfaces that, in operation, configures the remotely-located server to facilitate an integrated data exchange between the remotely-located server and at least one application running on at least one other computing device in communication with the remotely-located server, via the network interface, wherein the integrated data exchange does not include a pre-mapped or pre-structured electronic data interchange (EDI) transmission.

134. The system of claim 81, wherein invocation of the at least one evaluation service and/or execution of at least one predefined instruction that pertains to the at least one evaluation service causes the metrics application to obtain metric data from two or more different data sources.

135. The system of claim 81, wherein invocation of the at least one evaluation service and/or execution of one or more predefined instructions that pertain to the at least one evaluation service causes the metrics application to manage one or more user interfaces that incorporate predefined industry-specific terminology, industry-specific standards, and/or industry-specific practices.

136. The system of claim 81, wherein execution of at least one predefined instruction that pertains to the at least one evaluation service causes the metrics application, in coordination with the metric server adapter, to produce electronic documentation required to audit at least one performance metric generated for at least one side of a received or retrieved transaction data set, wherein data previously received or generated by the remotely-located server is retrieved from at least one database or tracking system accessible to the remotely-located server, wherein the metrics application is caused to replicate process steps of the at least one evaluation service using data previously associated with and used in each process step, and wherein the metrics application is further caused to communicate the electronic documentation, via the network interface, to at least the user-agent computing device from which the at least one transaction was received or at least one output predefined in at least one predefined instruction that pertains to the at least one evaluation service.

137. The system of claim 81, wherein at least one transaction data set received or retrieved by the metrics application was communicated or exposed to the remotely-located server by an exchange, a trading venue, a cooperative, a broker, or another third-party intermediary.

138. The system of claim 81, wherein the remotely-located server is under the control of a third-party payment processor, a credit provider, or a clearing organization.

139. The system of claim 81, wherein a user-agent computing device in communication with the remotely-located server is under the control of a third-party payment processor, a credit provider, or a clearing organization.

140. The system of claim 81, wherein at least one received or retrieved transaction data set represents a forward priced transaction in which price data for the respective item in the product specification data set or the price data set is associated with a delivery date in the future.

141. The system of claim 140, wherein invocation of the at least one evaluation service and/or execution of at least one predefined instruction that pertains to the at least one evaluation service causes the metric server adapter to define at least one transaction-specific instruction that causes the metrics application, in coordination with the metric server adapter, to apply at least one adjustment value to the market reference price data associated with the responsive item, wherein the at least one adjustment value represents a cost to hold the responsive item from the delivery date or time of service identified for the responsive item until the delivery date or time of service identified for the respective item.

142. The system of claim 81, wherein the communicated at least one performance metric is used, at least in part, to value at least one item or component of at least one side of an over-the-counter (OTC) or off-exchange transaction, a basis or hedge trade, a forward contract, an options contract, a swap, or to represent, at least in part, a value for:
　　at least one item or component underlying an exchange-traded futures contract, or
　　one or more items or component parts of an exchange-for-physical (EFP) transaction or an exchange-for-swap transaction (EFS), or
　　one or more items or component parts an exchange-traded futures contract executed using another exchange-approved alternate execution procedure.

143. The system of claim 81, wherein in response to receiving a triggering request from the user-agent computing device, the at least one communication application identifies an applicable protocol for communicating with the user-agent computing device and triggers the metrics application to manage at least one user interface customized for the user-agent, in coordination with the metric server adapter, wherein the customized user interface includes two or more preconfigured menus preloaded with a plurality of data elements previously defined by the user-agent in one or more predefined instructions managed by the metric server adapter, wherein two or more different data elements are dynamically selected by the user-agent to identify the at least one evaluation scenario for analysis.

144. In a networked environment, a system comprising:
a remotely-located server comprising:
  a network interface;
  a non-transitory computer-readable medium having computer-executable instructions stored thereon, wherein the computer-executable instructions, when executed, implement a plurality of components including:
    a metric server adapter;
    a metrics application; and
    at least one communication application; and
  a processor in communication with the network interface and the computer-readable medium, wherein the processor is configured to execute the computer-executable instructions stored in the computer-readable medium;
wherein:
the metric server adapter includes governing logic programmed to manage at least one evaluation service and a plurality of predefined instructions for managing metric data, and to dynamically define transaction-specific instructions for adapting metric data, wherein the plurality of predefined instructions includes instructions customized for a particular user-agent and/or industry;
the metrics application is a production application programmed to manage one or more purchase and/or analysis processes and to invoke and execute the at least one evaluation service in coordination with the metric server adapter, and to manage one or more user interfaces that, in operation, facilitate interactions with the remotely-located server;
the at least one communication application is programmed to manage one or more protocols that facilitate communications between one or more computing devices and the remotely-located server via the network interface; and
in operation, in response to receipt of a triggering request from a user-agent computing device, the at least one communication application identifies an applicable protocol for communicating with the user-agent computing device and the metrics application manages, in coordination with the metric server adapter, at least one customized user interface that includes two or more preconfigured menus preloaded with a plurality of data elements previously predefined in one or more predefined instructions that are preassociated with the at least one evaluation service, wherein two or more different data elements are dynamically selected by the user-agent to identify at least one evaluation scenario for analysis, wherein at least one selected data element identifies at least one item that is defined by a plurality of attributes having attribute data that includes two or more parameter values or identifies a plurality of items having a plurality of attributes that differ by at least one parameter value;
wherein identification of the at least one evaluation scenario for analysis triggers the metrics application to invoke the at least one evaluation service which causes the metrics application, for each item as identified in the at least one evaluation scenario, to:
  retrieve historical purchase data, filtered to be responsive to the two or more selected data elements of the at least one evaluation scenario, from one or more memories accessible to the remotely-located server, wherein the retrieved purchase data includes one or more price data sets that are responsive to the identified at least one item, each price data set including price data for at least one item possessing a plurality of attributes that include at least one parameter value;
  obtain metric data from at least one data source accessible to the remotely-located server for each price data set, wherein the obtained metric data represents market reference data for at least one responsive item having attributes corresponding to attributes of a respective item in the price data set, wherein each responsive item in the metric data possesses a plurality of attributes including at least one parameter value;
  evaluate the plurality of attributes of each responsive item in the metric data relative to the plurality of attributes for the respective item in the price data set to dynamically discover a difference in the attribute data, wherein a discovered difference is disclosed to the metric server adapter which enables the metric server adapter to contextually define transaction-specific instructions for adapting the metric data for the respective item;
  normalize the metric data by executing the transaction-specific instructions for adapting metric data for the respective item, wherein execution of at least one transaction-specific instruction causes one or more adjustment values to be generated and applied to the market reference price data for at least one responsive item that differs by at least one parameter value from the respective item, transforming the market reference price data for the at least one responsive item and automatically producing one or more transaction-specific market reference price data values for the respective item; and
  generate at least one performance metric that pertains to the at least one evaluation service for the at least one evaluation scenario, wherein each performance metric is based, at least in part, on one or a combination of the transaction-specific market reference price data values produced for the respective item in the price data set;
wherein the metrics application is further programmed to communicate, in cooperation with the at least one communication application, at least one performance metric generated for the at least one evaluation scenario, via the network interface, to at least the user-agent computing device.

145. The system of claim 144, wherein the metrics application is separate from the metric server adapter, and wherein coordinated operation of the metrics application with the metric server adapter enables the metrics application to algorithmically process the attribute data to dynamically identify at least one relationship comprising a difference in the attribute data, wherein the at least one relationship may include a new or previously unknown relationship.

146. The system of claim 145, wherein the metric server adapter uses the at least one relationship comprising a difference to ascertain which of the predefined instructions for adapting metric data are applicable to the responsive item, wherein the metric server adapter uses the attributes and one or more parameter values of the respective item, in combination with the predefined instructions for adapting metric data ascertained to be applicable to the responsive item, to contextually define transaction-specific instructions for adapting the metric data for the respective item.

147. The system of claim 144, wherein the metric server adapter is programmed to coordinate a conditional execution of the transaction-specific instructions for adapting metric data by the metrics application, including:
one or more formulas operationally combining data values and using variables relating to a plurality of items, attributes, parameters, events, or metric data sources; or
a combination of instructions, including validation rules and/or statistical criteria, relating to a plurality of items, attributes, parameters, vendors, events, metric data sources or the obtained metric data, the conditional execution of which is priority weighted, sequential, recursive, or subject to another method of control defined by the metric server adapter; or
a combined evaluation service that includes a plurality of interdependent transaction-specific instructions for adapting metric data, wherein at least one transaction-specific instruction is conditionally combined with at least one other transaction-specific instruction that specifies employing a process step, action, function, utility, or subroutine, or wherein the at least one evaluation service is combined with at least one other evaluation service, and wherein the conditional execution of the transaction-specific instructions of the combined evaluation service is priority weighted, sequential, recursive, or subject to another method of control defined by the metric server adapter.

148. The system of claim 144, wherein one or more parameter values represent attributes or conditions that are variable for a specific item or transaction.

149. The system of claim 148, wherein the one or more parameter values include at least one of a grade, a rating measure, a species, an item type, a brand, a quantity, a size, a unit of measure, a tally, a shipping or receiving location, a method of delivery, a delivery date, a time of service, a warranty, a payment term, or a transaction type.

150. The system of claim 144, wherein the identified at least one item represents a specific version or particular form of a physical product or raw material, an intangible product, a service, or a combination thereof.

151. The system of claim 144, wherein the identified at least one item is a bundled or combined item that represents a plurality of items in a packaged product or transaction, a tally, or an assembly of component parts, wherein each item or component part possesses a plurality of attributes having attribute data that differs by at least one parameter value.

152. The system of claim 144, wherein the governing logic comprises a module or application or a separate application layer, wherein the governing logic cohesively manages a plurality of predefined instructions that pertain to the at least one evaluation service, wherein the predefined instructions identify rules or variables or criteria that were predefined and preassociated with the at least one evaluation service, and wherein the predefined instructions serve to identify or modify features or elements that pertain to the at least one evaluation service or to limit at least one functionality of the at least one evaluation service or a feature or element identified therein.

153. The system of claim 144, wherein invocation of the at least one evaluation service and/or execution of at least one predefined instruction that pertains to the at least one evaluation service causes the metrics application to automatically query one or more databases or data sources accessible to the remotely-located server or to monitor one or more data streams to obtain metric data for one or more items responsive to the attributes of at least one item identified in at least one retrieved price data set.

154. The system of claim 144, wherein invocation of the at least one evaluation service and/or execution of at least one predefined instruction that pertains to the at least one evaluation service causes the metric server adapter to define at least one transaction-specific instruction that causes the metrics application to filter, for inclusion or exclusion, the responsive items in the metric data using one or more predefined control values, criteria, or parameters, and to use only a filtered segment of the metric data to produce the one or more transaction-specific market reference price data values for the respective item.

155. The system of claim 144, wherein the transformation of the market reference price data occurs independent of unit-of-measure conversion of data in the metric data for responsive items that are defined by a unit of measure.

156. The system of claim 144, wherein invocation of the at least one evaluation service and/or execution of at least one predefined instruction that pertains to the at least one evaluation service causes the metrics application to compare one or more of the performance metrics generated for the identified at least one item to one or more corresponding performance metrics previously generated for the at least one item, a predefined base market value, or one or more current market values reported by an exchange or trading venue or a third-party price reporting service for the at least one item, and to communicate, via the network interface, a result of the comparison to at least the user-agent computing device.

* * * * *